(12) United States Patent
Reuven et al.

(10) Patent No.: US 7,720,169 B2
(45) Date of Patent: May 18, 2010

(54) MULTIPLE-INPUT MULTIPLE-OUTPUT (MIMO) DETECTOR INCORPORATING EFFICIENT SIGNAL POINT SEARCH AND SOFT INFORMATION REFINEMENT

(76) Inventors: Ilan Reuven, 6 Bader Yohanan St., Ramat Gan 52286 (IL); Assaf Ben-Yishai, 12 Levi Eshkol St, Ra'anana 43703 (IL)

( * ) Notice: Subject to any disclaimer, the term of this patent is extended or adjusted under 35 U.S.C. 154(b) by 517 days.

(21) Appl. No.: 11/746,806

(22) Filed: May 10, 2007

(65) Prior Publication Data

US 2008/0279299 A1 Nov. 13, 2008

(51) Int. Cl.
*H04B 7/02* (2006.01)
*H04L 1/02* (2006.01)

(52) U.S. Cl. ............... 375/267; 375/341; 375/347

(58) Field of Classification Search .............. 375/267, 375/341, 347
See application file for complete search history.

(56) References Cited

U.S. PATENT DOCUMENTS

| | | | |
|---|---|---|---|
| 6,810,105 B2 | 10/2004 | Nasser-ghodsi et al. | |
| 2005/0271166 A1 | 12/2005 | Love et al. | |
| 2006/0146950 A1 | 7/2006 | Hoo | |
| 2008/0152027 A1* | 6/2008 | Kalluri et al. | ........... 375/260 |

FOREIGN PATENT DOCUMENTS

WO WO2006/101093 9/2006

OTHER PUBLICATIONS

S. Liu et al., "Near-optimum soft decision equalization for frequency selective MIMO channels", IEEE Transactions on Signal Processing, vol. 52, Issue 3, Mar. 2004, pp. 721-733.

B. Hassibi, et al., "On the sphere decoding algorithm I. Expected complexity," IEEE Trans. Signal Process., vol. 53, No. 8, pp. 2806-2818, Aug. 2005.

P. Wolniansky, et al.,"V-BLAST: an architecture for realizing very high data rates over the rich-scattering wireless channel", in Proc. of the IEEE URSI International Symposium on Signals, Systems, and Electronics (New York, NY, USA), pp. 295-300, 1998.

M. Pohst, "On the computation of lattice vectors of minimal length, successive minima and reduced bases with applications," ACM SIGSAM Bull., vol. 15, pp. 37-44, Feb. 1981.

C. P. Schnorr, et al., "Lattice basis reduction: Improved practical algorithms and solving subset sum problems," Math. Programming, vol. 66, pp. 181-191, 1994.

(Continued)

*Primary Examiner*—Curtis B Odom
(74) *Attorney, Agent, or Firm*—Zaretsky Patent Group PC; Howard Zaretsky

(57) ABSTRACT

A novel and useful apparatus for and method of multiple input multiple output (MIMO) detection for use in MIMO based communication systems. The mechanism of the invention performs a simplified tree search utilizing a single stage expansion of the most likely first symbol candidates, in the case of a 2×2 MIMO system. The invention also provides a refinement mechanism operative to significantly improve the soft information (i.e. log likelihood ratio) of the list of candidates. To improve the soft information, the mechanism applies one or more refinement rounds to generate additional candidates for both first and second detected symbols.

20 Claims, 21 Drawing Sheets

OTHER PUBLICATIONS

A. Burg, et al., "VLSI implementation of MIMO detection using the sphere decoding algorithm," IEEE J. Solid-State Circuits, vol. 40, No. 7, pp. 1566-1577, Jul. 2005.

Z. Guo, et al., "Algorithm and Implementation of the K-Best Sphere Decoding for MIMO Detection," IEEE J. Select. Areas in Commun., vol. 24, No. 3, Match 2006.

B. M. Hochwald, et al., "Achieving near-capacity on a multiple-antenna channel," IEEE Trans. Commun., vol. 51, No. 3, pp. 389-399, Mar. 2003.

K. Wong, et al., "Achieving single user performance in FEC coded DC-CDMA system using the low-complexity soft-output M-Algorithm," in Proc. of the IST Conference, Dresden, Jun. 2005.

K.-W. Wong, et al.," A VLSI architecture of a K-Best lattice decoding algorithm for MIMO channels," in Proc. IEEE Int. Symp. Circuits Syst., May 2002, pp. III-273-III-276.

K. Higuchi, et al., "Adaptive selection of surviving symbol replica candidates based on maximum reliability in QRM-MLD for OFCDM MIMO Multiplexing," pp. 2480-2486, Globecom 2004.

J. Hagenauer, et al., "The list-sequential (LISS) algorithm and its applications," submitted for publication in IEEE Trans. Commun., vol. 55, No. 5, pp. 918-928, May 2007.

3GPP TR 25.814: 3rd Generation Partnership Project; Technical specification group radio access network; Physical layer aspects for evolved universal terrestrial radio access (UTRA).

IEEE Std 802.16-2004, "Air Interface for Fixed Broadband Wireless Access Systems," Oct. 1, 2004.

IEEE Std 802.16e-2005 and IEEE Std 802.16-2004/Corl-2005: "Air Interface for Fixed and Mobile Broadband Wireless Access Systems. Amendment 2: Physical and Medium Access Control Layers for Combined Fixed and Mobile Operation in Licensed Bands," Feb. 28, 2006.

* cited by examiner

| | $s_1$ | $s_2$ | EUCLIDEAN DISTANCE |
|---|---|---|---|
| ENTRY 1 | | | |
| ⋮ | | ⋮ | |
| ENTRY K | | | |

212 (top right of table)

K ENTRIES

MULTIPLE-INPUT MULTIPLE-OUTPUT (MIMO) DETECTOR INCORPORATING EFFICIENT SIGNAL POINT SEARCH AND SOFT INFORMATION REFINEMENT

REFERENCE TO RELATED APPLICATION

This application is related to U.S. application Ser. No. 11/746,781, filed May 10, 2007, entitled "Multiple-Input Multiple-Output (MIMO) Detector Incorporating Efficient Signal Point Search," incorporated herein by reference in its entirety.

FIELD OF THE INVENTION

The present invention relates generally to communication systems and more particularly relates to a multiple-input, multiple-output (MIMO) detection system that incorporates an efficient signal point search mechanism and soft information refinement.

BACKGROUND OF THE INVENTION

Multiple input, multiple output (MIMO) communication systems are known in the art. The term MIMO refers to communication systems that employ an array of antennas at both the transmitter and the receiver. A system having a single transmit antenna and two receive antennas is commonly referred to as a receive diversity system. A system having multiple transmit antennas and a single receive antenna is commonly referred to as a transmit diversity system. Transmit diversity systems commonly use space-time codes such as an Alamouti codes. A system having multiple transmit and multiple receive antennas is referred to as a MIMO system.

Space-time block coding is a well known technique used in wireless communication systems to transmit multiple representations of a data stream across a number of antennas and to exploit the various received versions of the data to improve the reliability of data-transfer. Since the transmitted data traverses a potentially difficult environment with scattering, reflection, refraction, etc. in addition to corruption by thermal noise in the receiver, some representations of the received data will be in better shape than others. This redundancy results in a higher chance of being able to use one or more of the received representations of the data to correctly decode the received signal. Space-time coding combines all copies of the received signal in an optimal way so as to extract as much information from each copy as is possible.

There are two basic motivations for using multiple antennas in a wireless communications system. The first motivation is to gain an improvement in diversity, while the second motivation is to gain an improvement in achievable data rate/capacity. Multiple transmit antennas may be used to convey either dependent data streams (to increase immunity to fading or increase coverage) or independent data streams (to increase the capacity or data rate of the system). These two motivations are illustrated using examples of two simple MIMO systems.

The first example refers to a system having a single transmit antenna and two receive antennas, such as system 10 shown in FIG. 1A. It is assumed that the channels or links between the transmit antenna and the receive antennas are independent fading channels, i.e., both links have a certain outage probability, which is defined as the probability of being in a relatively deep fade and may be practically disconnected. If the fade (i.e. outage) events are independent, then the probability that both channels fade together is smaller than the outage probability of an individual channel. Hence, the system with two receive antennas has a smaller outage probability and is therefore more reliable. The reduction in the outage probability is referred to as the diversity gain, and a system having two receive antennas has a larger diversity than the system having a single receive antenna. That is, it utilizes multiple, diverse replication of the transmitted signal.

The second motivation for the use of a multiple antenna system is the improvement in available data rate. Consider a system 12 shown in FIG. 1B where the data is conveyed over two independent channels with no inter-antenna interference. It is assumed that both communication links are identical, i.e. have the same statistical characteristics. It is noted that if each single channel can reliably convey a certain data rate then the aggregate data rate which can reliably be reconstructed at the receiver end using both channels is twice the data rate of one of the channels.

The problem, however, in the construction of feasible MIMO receivers is the fact that there is interference (i.e. cross coupling) between the two transmit/receive chains, as shown in the system 14 of FIG. 1C. Due to this fact, the MIMO receiver does not simply reduce to two independent single input, single output (SISO) receivers, thus entailing twice the computational complexity of a SISO receiver. The capacity of a practical MIMO system, however, grows linearly with the dimension of the MIMO system. The computational complexity of an optimum receiver in this case is not twice that of a SISO receiver, but is the complexity of a SISO receiver squared. As the number of dimensions increases, the detection problem becomes very complex. Assuming M-ary signaling in each dimension (transmit/receive antenna), an N-dimensional signaling vector results in $M^N$ possible transmit signals in each channel use (i.e. transmit time in which all of the dimensions are used). The exponential growth of the signaling set with the dimension of the channel model necessitates suboptimum, reduced complexity detectors.

The two advantages of MIMO systems mentioned supra, make MIMO an appealing feature in wideband wireless communication systems. Currently, there is considerable interest in MIMO systems, and a majority of the current state of the art communication standards such as 3GPP LTE, IEEE 802.11n and IEEE Std 802.16e (i.e. WiMAX) incorporate several MIMO features.

Thus, there is a need for a MIMO detection solution that is capable of providing both hard and soft information (i.e. soft value) decisions for use by a channel decoder. It is further desirable that the detection solution provide a capability of improving the quality of the soft information decisions. The MIMO detector should minimize the required computational complexity requirements while maximizing the receiver bit error rate performance.

SUMMARY OF THE INVENTION

Accordingly, the present invention provides a novel and useful apparatus for and method of multiple input multiple output (MIMO) detection for use in MIMO based communication systems. The invention comprises a mechanism for performing a simplified tree search utilizing a single stage expansion of the most likely first symbol candidates, in the case of a 2×2 MIMO system.

The invention also provides a refinement mechanism that is operative to significantly improve the soft information (e.g., log likelihood (LLR)) of the list of candidates. To improve the soft information, the mechanism applies one or more refinements rounds to generate additional candidates for both first and second detected symbols. Rather than lengthening the candidate list so as to increase the probability of obtaining desired candidates, the refinement mechanism is operative, using the hard decision, to construct additional candidates having a bit of interest opposite to that of a corresponding bit in the hard decision that optimizes a cost function.

The invention thus provides a MIMO receiver having a substantial advantage over prior art receivers. Advantages of the MIMO detection scheme include (1) lower computational complexity and (2) improved receiver bit error rate (BER) performance. A reduction in receiver complexity translates to a reduction in the receiver die size and power consumption. Improved receiver performance increases both the communication coverage and system throughput.

The MIMO detection mechanism of the present invention is suitable for use in many types of communication receivers, e.g., digital receivers. A receiver incorporating the MIMO detection mechanism of the present invention may be coupled to a wide range of channels and is particularly useful in improving the performance of MIMO based OFDM/OFDMA wireless communications systems, including but not limited to, Worldwide Interoperability for Microwave Access (WiMAX), Wireless Local Area Network (WLAN), Ultra-Wideband (UWB), Broadband Wireless Access (BWA), etc.

Other wireless communications systems that can benefit from the present invention are those whose channels that are typically characterized by fading and multipath propagation with rapidly changing channel impulse response. The MIMO detection mechanism of the present invention takes advantage of the multipath properties of environments wherein radio signals bounce off buildings, trees and other objects as they travel between one point and another. The MIMO detection mechanism of the invention is capable of taking the multiple echoes of the signal that arrive at the receiver antenna and efficiently generating soft bit value information for subsequent use by the channel decoder.

To aid in illustrating the principles of the present invention, the apparatus and method are presented in the context of an MIMO OFDM communications receiver. It is not intended that the scope of the invention be limited to the examples presented herein. One skilled in the art can apply the principles of the present invention to numerous other types of communication systems as well (wireless and non-wireless) without departing from the scope of the invention.

Many aspects of the invention described herein may be constructed as software objects that execute in embedded devices as firmware, software objects that execute as part of a software application on either an embedded or non-embedded computer system running a real-time operating system such as WinCE, Symbian, OSE, Embedded LINUX, etc., or non-real time operating systems such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of soft information refinement of a second detected symbol for use in multiple-input, multiple-output (MIMO) systems, the method comprising the steps of for each information bit of the second detected symbol, searching for a constellation symbol having a bit of interest opposite to that of a corresponding bit of a hard decision of the second detected symbol that optimizes a cost function and forming additional candidate symbol pairs, each comprising a hard decision of a first detected symbol mated with one of the found constellation symbols.

There is also provided in accordance with the invention, a method of soft information refinement of a first detected symbol for use in multiple-input, multiple-output (MIMO) systems, the method comprising the steps of for each bit in the first detected symbol that is common in all candidate symbol pairs within a basic candidate list, setting a first quadrature component associated with the bit of interest in the first detected symbol to a symbol value closest to the hard decision of the first quadrature component whose bit of interest is opposite in value thereto, setting a second quadrature component of the first detected symbol to its corresponding value in the hard decision to generate a modified first detected symbol thereby and forming an additional candidate symbol pair by mating the modified first detected symbol to a second symbol, wherein the second symbol in the additional candidate pair is chosen to optimize a cost function when mated with the modified first detected symbol.

There is further provided in accordance with the invention, an apparatus for soft information refinement of a second detected symbol in a multiple-input, multiple-output (MIMO) system comprising a processor operative to search, for each information bit of the second detected symbol, for a constellation symbol having a bit of interest opposite to that of a corresponding bit of a hard decision of the second detected symbol that optimizes a cost function, assemble additional candidate symbol pairs, each comprising a hard decision of a first detected symbol mated with one of the found constellation symbols and a memory for storing the additional candidate symbol pairs.

There is also provided in accordance with the invention, an apparatus for soft information refinement of a first detected symbol in a multiple-input, multiple-output (MIMO) system comprising a processor operative to set, for each bit in the first detected symbol that is common in all candidate symbol pairs, a first quadrature component associated with the bit of interest in the first detected symbol to a symbol value closest to the hard decision of the first quadrature component whose bit of interest is opposite in value thereto, set a second quadrature component of the first detected symbol to its corresponding value in the hard decision to generate a modified first detected symbol thereby, form an additional candidate symbol pair by mating the modified first detected symbol to a second symbol, wherein the second symbol in the additional candidate pair is chosen to optimize a cost function when mated with the modified first detected symbol and a memory for storing the additional candidate symbol pairs.

There is further provided in accordance with the invention, a computer program product characterized by that upon loading it into computer memory a soft information refinement process is executed, the computer program product comprising a computer usable medium having computer usable program code for performing soft information refinement of a second detected symbol in a multiple-input, multiple-output (MIMO) system, the computer program product including, computer usable program code for searching, for each information bit of the second detected symbol, for a constellation symbol having a bit of interest opposite to that of a corresponding bit of a hard decision of the second detected symbol that optimizes a cost function and computer usable program code for forming additional candidate symbol pairs, each comprising a hard decision of a first detected symbol mated with one of the found constellation symbols.

There is also provided in accordance with the invention, a computer program product characterized by that upon loading it into computer memory a soft information refinement process is executed, the computer program product comprising a computer usable medium having computer usable program code for performing soft information refinement of a first detected symbol in a multiple-input, multiple-output (MIMO) system, the computer program product including, computer usable program code for setting, for each bit in the first detected symbol that is common in all candidate symbol pairs, a first quadrature component associated with the bit of interest in the first detected symbol to a symbol value closest to the hard decision of the first quadrature component whose bit of interest is opposite in value thereto, computer usable program code for setting a second quadrature component of the first detected symbol to its corresponding value in the hard decision to generate a modified first detected symbol thereby, and computer usable program code for forming an additional candidate symbol pair by mating the modified first detected symbol to a second symbol, wherein the second symbol in the additional candidate pair is chosen to optimize a cost function when mated with the modified first detected symbol.

There is further provided in accordance with the invention, a multiple-input, multiple-output (MIMO) radio receiver coupled to a plurality of antennas comprising a radio frequency (RF) receiver front end circuit for receiving a plurality of radio signals transmitted over a MIMO channel and downconverting the received radio signals to baseband signals, a demodulator adapted to demodulate the baseband signal in accordance with the modulation scheme used to generate the transmitted radio signals, a MIMO soft information refinement processor for refining a second detected symbol, the processor operative to search, for each information bit of the second detected symbol, for a constellation symbol having a bit of interest opposite to that of a corresponding bit of a hard decision of the second detected symbol that optimizes a cost function, assemble additional candidate symbol pairs, each comprising a hard decision of a first detected symbol mated with one of the found constellation symbols, generate soft bit information values as a function of the additional candidate symbol pairs and a channel decoder operative to receive and decode the soft bit information values to generate receive data therefrom.

There is also provided in accordance with the invention, a multiple-input, multiple-output (MIMO) radio receiver coupled to a plurality of antennas comprising a radio frequency (RF) receiver front end circuit for receiving a plurality of radio signals transmitted over a MIMO channel and downconverting the received radio signals to baseband signals, a demodulator adapted to demodulate the baseband signal in accordance with the modulation scheme used to generate the transmitted radio signals, a MIMO soft information refinement processor for refining a first detected symbol, the processor operative to set, for each bit in the first detected symbol that is common in all candidate symbol pairs, a first quadrature component associated with the bit of interest in the first detected symbol to a symbol value closest to the hard decision of the first quadrature component whose bit of interest is opposite in value thereto, set a second quadrature component of the first detected symbol to its corresponding value in the hard decision to generate a modified first detected symbol thereby, form an additional candidate symbol pair by mating the modified first detected symbol to a second symbol, wherein the second symbol in the additional candidate pair is chosen to optimize a cost function when mated with the modified first detected symbol and a channel decoder operative to receive and decode the soft bit information values to generate receive data therefrom.

BRIEF DESCRIPTION OF THE DRAWINGS

The invention is herein described, by way of example only, with reference to the accompanying drawings, wherein:

FIG. 12 is a diagram illustrating the structure of the list of contender symbol pairs;

DETAILED DESCRIPTION OF THE INVENTION

Notation Used Throughout

Figure 1A:
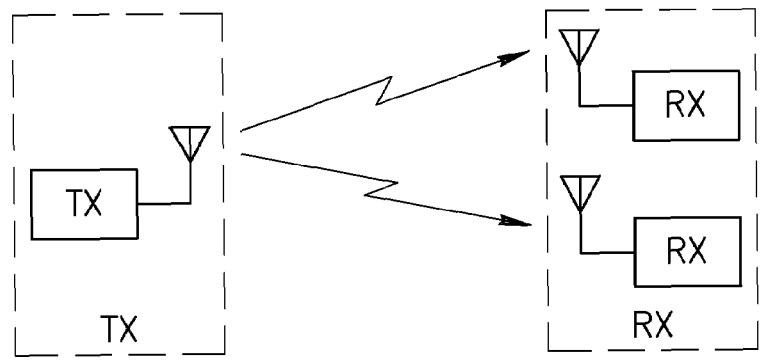
FIG. 1A is a diagram illustrating an example prior art receive diversity SIMO (single-input, multiple-output) communication system.
Figure 1B:
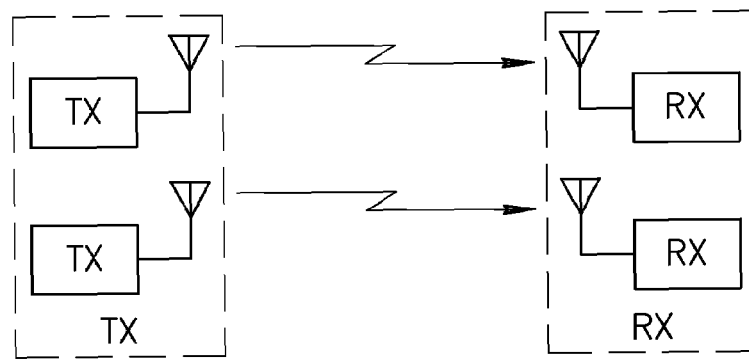
FIG. 1B is a diagram illustrating an example prior art 2×2 MIMO communication system with no inter-antenna interface.
Figure 1C:
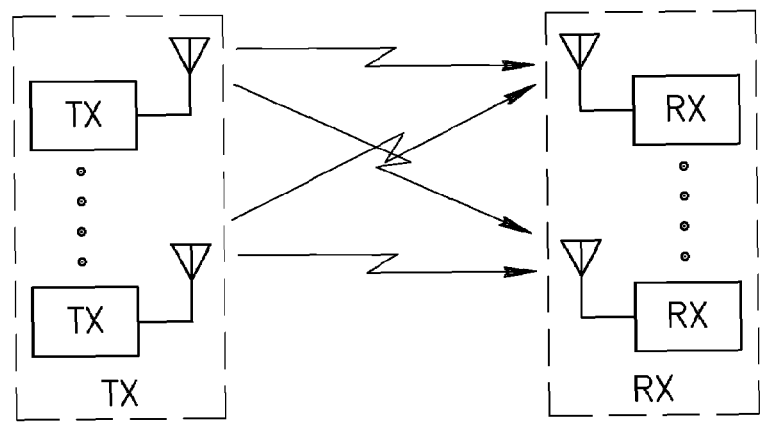
FIG. 1C is a diagram illustrating an example prior art 2×2 MIMO communication system with inter-antenna interference.

The following notation is used throughout this document.

| Term | Definition |
| --- | --- |
| A/D | Analog to Digital Converter |
| AC | Alternating Current |
| ASIC | Application Specific Integrated Circuit |
| BER | Bit Error Rate |
| BLAST | Bell-Labs Layered Space Time |
| BWA | Broadband Wireless Access |
| CD-ROM | Compact Disc Read Only Memory |
| CP | Cyclic Prefix |
| CPU | Central Processing Unit |
| D/A | Digital to Analog Converter |
| DC | Direct Current |
| DSP | Digital Signal Processor |
| DVD-ROM | Digital Versatile Disk-Read Only Memory |
| EEROM | Electrically Erasable Read Only Memory |
| EPROM | Erasable Programmable Read Only Memory |
| FFT | Fast Furrier Transform |
| FM | Frequency Modulation |
| FPGA | Field Programmable Gate Array |
| FTP | File Transfer Protocol |
| GSM | Global System for Mobile Communication |
| HDL | Hardware Description Language |
| HTTP | Hyper Text Transport Protocol |
| IEEE | Institute of Electrical and Electronic Engineers |
| LAN | Local Area Network |
| LLR | Log Likelihood Ratio |
| LS | Least Squares |
| LSD | List Sphere Decoding |
| MIMO | Multiple Input Multiple Output |
| ML | Maximum Likelihood |
| MMSE | Minimum Mean Square Error |
| NIC | Network Interface Card |
| NP | Non Polynomial |
| OFDM | Orthogonal Frequency Division Multiplexing |
| OFDMA | Orthogonal Frequency Division Multiple Access |
| PDA | Personal Digital Assistant |
| QAM | Quadrature Amplitude Modulation |
| QPSK | Quadrature Phase Shift Keying |
| QRD | QR Decomposition |
| RAM | Random Access Memory |
| RF | Radio Frequency |
| ROM | Read Only Memory |
| SD | Sphere Decoding |
| SE | Schnorr-Euchner |
| SIC | Successive Interference Cancellation |
| SIM | Subscriber Identity Module |
| SISO | Single Input Single Output |
| SNR | Signal to Noise Ratio |
| SVD | Singular Value Decomposition |
| TV | Television |
| USB | Universal Serial Bus |
| UWB | Ultra Wideband |
| V-BLAST | Vertical Bell-Labs Layered Space Time |
| WAN | Wide Area Network |
| WiMAX | Worldwide Interoperability for Microwave Access |
| WLAN | Wireless Local Area Network |
| ZF | Zero Forcing |

Detailed Description of the Invention

The present invention provides a novel and useful apparatus for and method of multiple input multiple output (MIMO) detection for use in MIMO based communication systems. The invention comprises a mechanism for performing a simplified tree search utilizing a single stage expansion of the most likely first symbol candidates, in the case of a 2×2 MIMO system. The invention also provides a refinement mechanism that is operative to significantly improve the soft information (e.g., log likelihood ratio (LLR)) of the list of candidates. To improve the soft information, the mechanism applies refinements rounds to generate additional candidates for both first and second detected symbols.

The MIMO detection mechanism of the present invention is suitable for use in many types of communication receivers, e.g., digital receivers. A receiver incorporating the MIMO detection mechanism of the present invention may be coupled to a wide range of channels and is particularly useful in improving the performance of MIMO based OFDM/OFDMA wireless communications systems, including but not limited to, Worldwide Interoperability for Microwave Access (WiMAX), Wireless Local Area Network (WLAN), Ultra-Wideband (UWB), Broadband Wireless Access (BWA), etc.

Other wireless communications systems that can benefit from the present invention are those whose channels that are typically characterized by fading and multipath propagation with rapidly changing channel impulse response. The MIMO detection mechanism of the present invention takes advantage of the multipath properties of environments wherein radio signals bounce off buildings, trees and other objects as they travel between one point and another. The MIMO detection mechanism of the invention is capable of taking the multiple echoes of the signal that arrive at the receiver antenna at slightly different times causing signal quality degradation and efficiently generating soft bit value information for use by the channel decoder.

To aid in illustrating the principles of the present invention, the apparatus and method are presented in the context of an MIMO OFDM communications receiver. It is not intended that the scope of the invention be limited to the examples presented herein. One skilled in the art can apply the principles of the present invention to numerous other types of communication systems as well (wireless and non-wireless) without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMax, WiMedia, WiFi, or any other broadband medium, etc. Examples of wired media include twisted pair, coaxial, optical fiber, any wired interface (e.g., USB, Firewire, Ethernet, etc.). The terms communications channel, link and cable are used interchangeably.

The term soft information is defined as any symbol or bit related information other than a hard decision that is intended to be subsequently used by the channel decoder. The terms Euclidean distance and metric are used to denote, in general, a cost function. All three terms (Euclidean distance, metric and cost function) are used interchangeably throughout this document. The term hard decision is defined as the symbol pair that optimizes a cost function or alternatively as the symbol pair having a minimum Euclidean distance.

The word 'exemplary' is used herein to mean 'serving as an example, instance, or illustration.' Any embodiment described herein as 'exemplary' is not necessarily to be construed as preferred or advantageous over other embodiments.

Computer Embodiment

Figure 2:
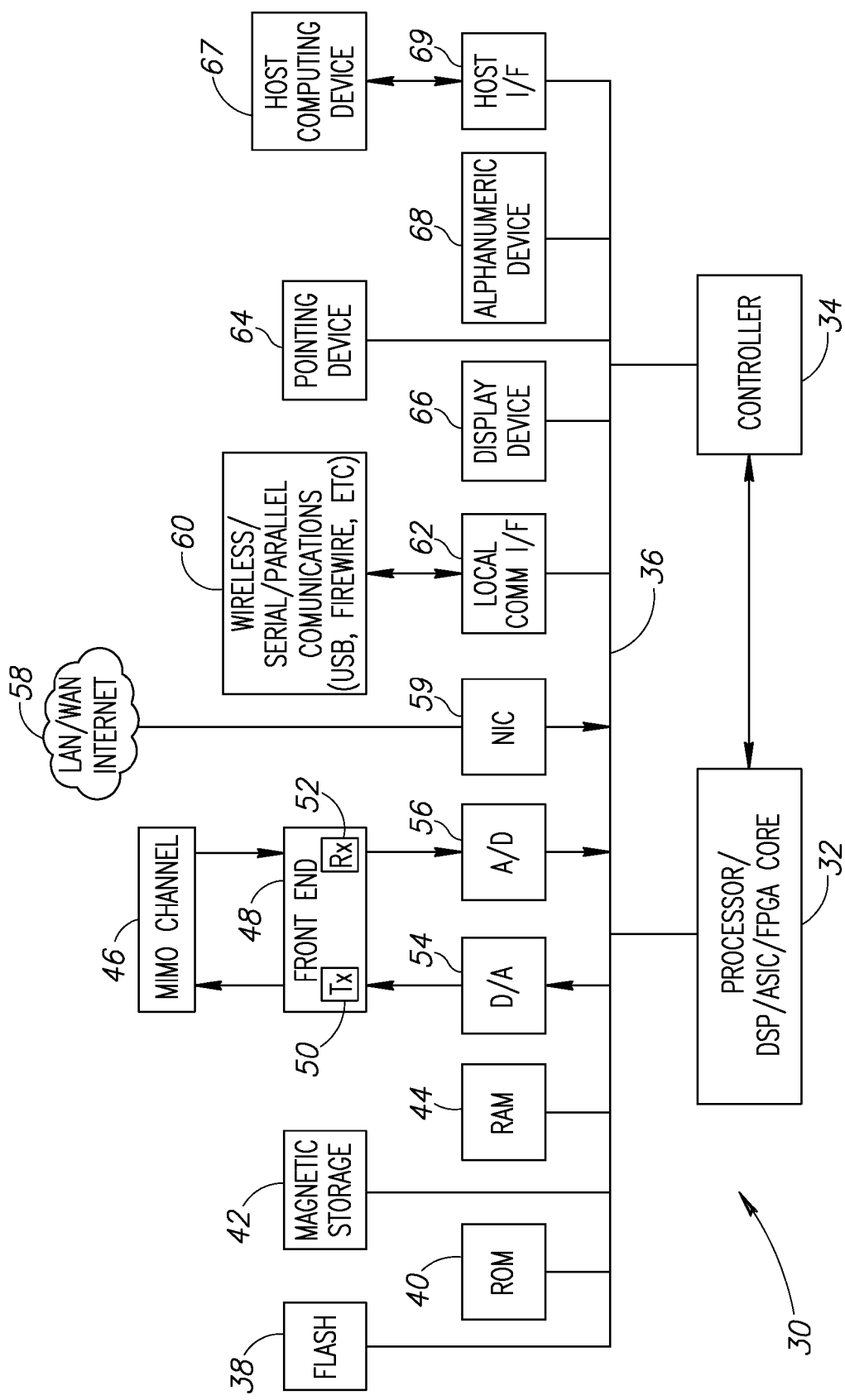
FIG. 2 is a block diagram illustrating an example computer processing system adapted to implement the MIMO detection mechanism of the present invention.

The present invention is be applicable to implementations of the invention in integrated circuits or chip sets, wired or wireless implementations, switching system products and transmission system products. For example, a computer is operative to execute software adapted to implement the MIMO detection mechanism of the present invention. A block diagram illustrating an example computer processing system adapted to perform the MIMO detection mechanism of the present invention is shown in FIG. 2. The system may be incorporated within a communications device such as a receiver or transceiver, some or all of which may be implemented in software, hardware or a combination of software and hardware.

The computer system, generally referenced 30, comprises a processor 32 which may include a digital signal processor (DSP), central processing unit (CPU), microcontroller, microprocessor, microcomputer, ASIC or FPGA core. The processor may be adapted to implement the MIMO detection mechanism in hardware while a controller 34 performs administrative, control and other higher order tasks. Like the processor, the controller 34 may include a digital signal processor (DSP), central processing unit (CPU), microcontroller, microprocessor, microcomputer, ASIC or FPGA core. The system also comprises static read only memory 40, Flash memory 38 and dynamic main memory (RAM) 44 all in communication with the processor and controller via bus 36. The processor and controller are also in communication with a number of peripheral devices that are also included in the computer system. Peripheral devices coupled to the bus include a display device 66 (e.g., monitor), alpha-numeric input device 68 (e.g., keyboard) and pointing device 64 (e.g., mouse, tablet, etc.)

In the receive direction, signals received over the MIMO channel 46 are first input to the RF front end circuitry 48 which comprises a receiver section 52 and a transmitter section 50. Note that the MIMO system may incorporate a plurality of receive and transmit chains. In each chain, baseband samples of the received signal are generated by the A/D converter 56 and read by the processor. Baseband samples generated by the processor are converted to analog by D/A converter 54 before being input to the transmitter for transmission over the channel via the RF front end.

The computer system is connected to one or more external networks such as a LAN or WAN 58 via communication lines connected to the system via a network interface card (NIC) 59. A local communications I/F port(s) 62 provides connections to various wireless and wired links and serial and parallel devices 60. Examples include peripherals (e.g., printers, scanners, etc.), wireless links (e.g., Bluetooth, UWB, WiMedia, WiMAX, etc.) and wired links (e.g., USB, Firewire, etc.) The network adapters and local communications I/F port(s) coupled to the system enable the data processing system to become coupled to other data processing systems or remote printers or storage devices through intervening private or public networks. Modems, cable modem and Ethernet cards are just a few of the currently available types of network adapters.

A host interface 69 connects a host device 67 to the system. The host is adapted to configure, control and maintain the operation of the system. The system also comprises magnetic or semiconductor based storage device 42 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the MIMO detection mechanism of the present invention is adapted to reside on a computer readable medium, such as a magnetic disk within a disk drive unit. Alternatively, the computer readable medium may comprise a floppy disk, removable hard disk, Flash memory card, EEROM based memory, bubble memory storage, ROM storage, distribution media, intermediate storage media, execution memory of a computer, and any other medium or device capable of storing for later reading by a computer a computer program implementing the method of this invention. The software adapted to implement the MIMO detection mechanism of the present invention may also reside, in whole or in part, in the static or dynamic main memories or in firmware within the processor of the computer system (i.e. within microcontroller, microprocessor or microcomputer internal memory).

In alternative embodiments, the MIMO detection mechanism of the present invention may be applicable to implementations of the invention in integrated circuits, field programmable gate arrays (FPGAs), chip sets or application specific integrated circuits (ASICs), wired or wireless implementations and other communication system products.

Other digital computer system configurations can also be employed to perform the MIMO detection mechanism of the present invention, and to the extent that a particular system configuration is capable of performing the method of this invention, it is equivalent to the representative digital computer system of FIG. 2 and within the spirit and scope of this invention.

Once they are programmed to perform particular functions pursuant to instructions from program software that implements the method of this invention, such digital computer systems in effect become special purpose computers particular to the method of this invention. The techniques necessary for this are well-known to those skilled in the art of computer systems.

It is noted that computer programs implementing the method of this invention will commonly be distributed to users on a distribution medium such as floppy disk, CD-ROM, DVD-ROM, etc. or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout this document, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Alternatively, such terms can refer to actions and processes performed by hardware circuits operative to implement these actions and processes.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc. In other embodiments, the mechanism of the invention is implemented in hardware circuitry such as a custom chip, ASIC, FPGA, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device/Cellular Phone/PDA System

Figure 3:
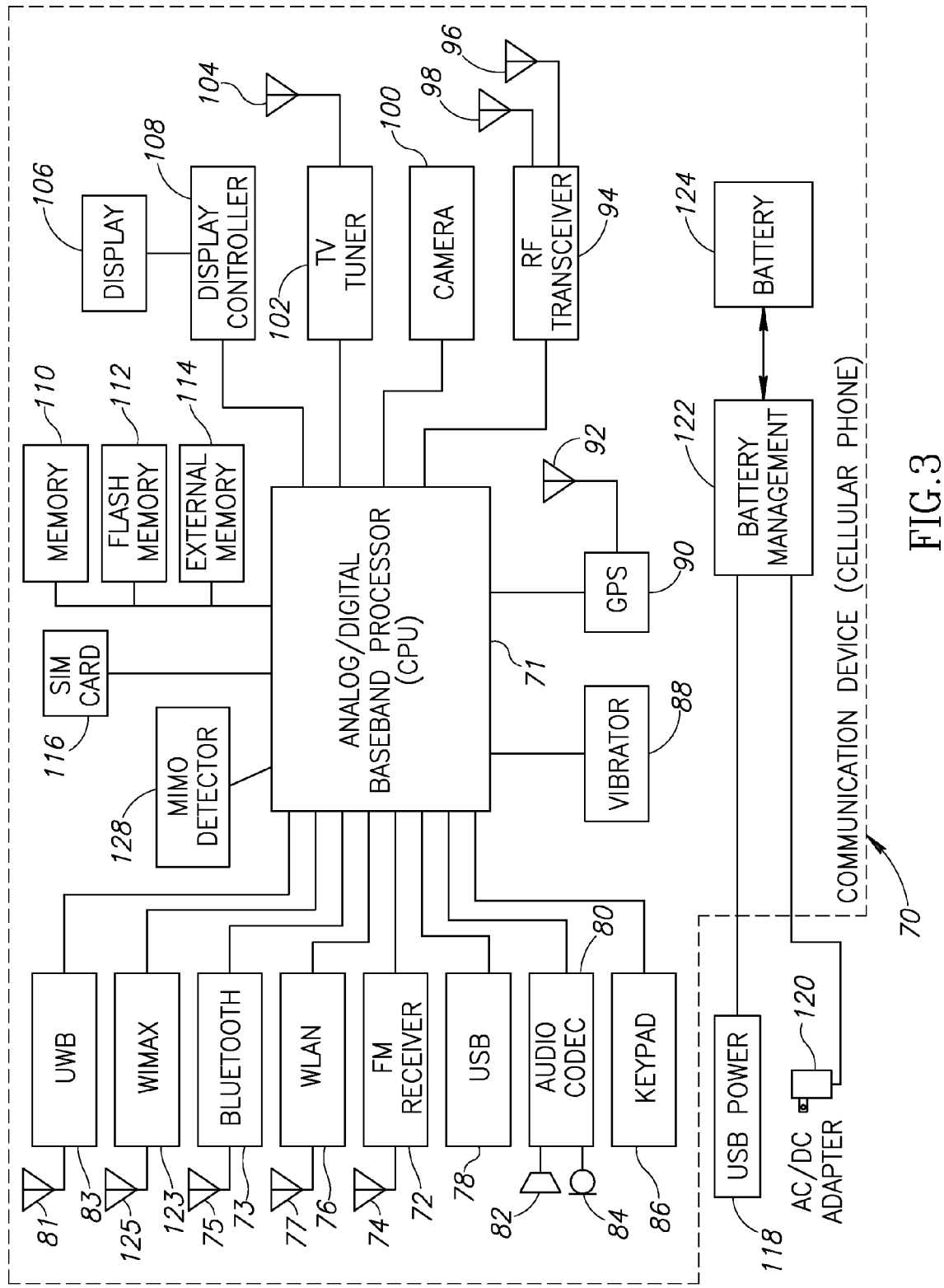
FIG. 3 is a block diagram illustrating an example wireless mobile device incorporating the MIMO detection mechanism of the present invention.

A block diagram illustrating an example communication device in more detail is shown in FIG. 3. The communication device may comprise any suitable wired or wireless device such as multimedia player, mobile device, cellular phone, smartphone, PDA, Bluetooth device, etc. For illustration purposes only, the communication device is shown as a cellular phone. Note that this example is not intended to limit the scope of the invention as the MIMO detection mechanism of the present invention can be implemented in a wide variety of communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver 90 and associated antenna 92.

A USB interface connection 78 provides a serial link to a user's PC or other device. An FM receiver 72 and antenna 74 provide the user the ability to listen to FM broadcasts. WLAN radio and interface 76 and antenna 77 provide wireless connectivity when in a hot spot or within the range of an ad hoc, infrastructure or mesh based wireless LAN network. Bluetooth radio and interface 73 and antenna 75 provide Bluetooth wireless connectivity when within the range of a Bluetooth wireless network. Ultra Wideband (UWB) radio and interface 83 and antenna 81 provide UWB wireless connectivity when within the range of a UWB wireless network. Similarly, WiMAX radio and interface 123 and antenna 125 provide WiMAX wireless connectivity when within the range of a WiMAX wireless network. SIM card 116 provides the interface to a user's SIM card for storing user data such as address book entries, etc.

The cellular phone also comprises a MIMO detection block 128 adapted to implement the MIMO detection mechanism of the present invention as described in more detail infra. In operation, the MIMO detection block 128 may be implemented as hardware, software executed as a task on the baseband processor 71 or as a combination of hardware and software. Implemented as a software task, the program code operative to implement the MIMO detection mechanism of the present invention is stored in one or more memories 110, 112 or 114.

Portable power is provided by the battery 124 coupled to battery management circuitry 122. External power is provided via USB power 118 or an AC/DC adapter 120 connected to the battery management circuitry which is operative to manage the charging and discharging of the battery 124.

MIMO Detection

Figure 4:
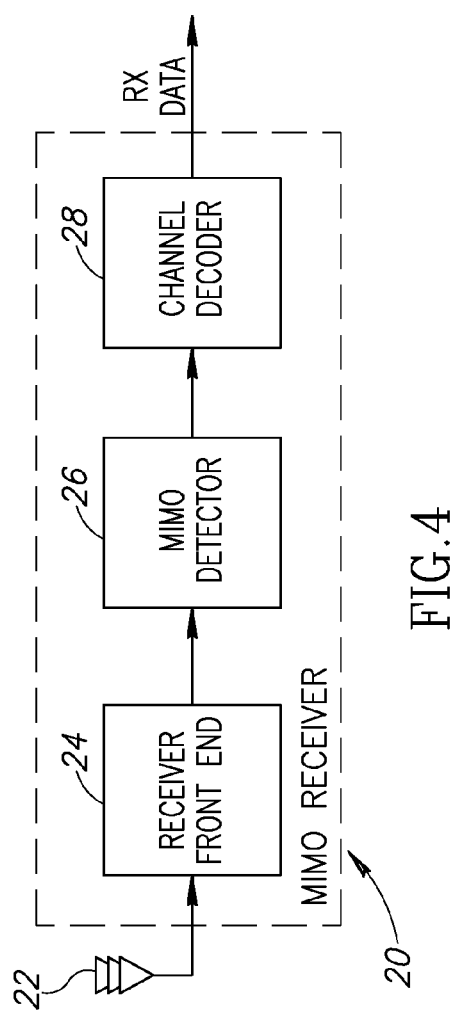
FIG. 4 is a block diagram illustrating an example RF receiver incorporating the MIMO detection mechanism of the present invention.

The present invention relates to MIMO detection used in coded communication systems. Coded communication systems are defined as communication systems that employ a channel code. In such systems, the MIMO detector feeds a channel decoder with soft values. Soft values may comprise log likelihood ratio (LLR) information per data bit that is indicative of the reliability of the decision regarding that bit. A high level functional block diagram of a receiver for a general coded communication system is shown in FIG. 4. The MIMO receiver, generally referenced 20, comprises a plurality of antennas 22, a receiver front end circuit 24, MIMO detector 26 and channel decoder 28. The Figure illustrates the position of the MIMO detector within the receiver. The MIMO detector 26 follows the receiver front-end processing block 24 which is dependent on the particular communication system implemented. For example, this block typically functions to provide filtering, conversion to base-band, sampling, equalization, noise mitigation, synchronization, etc. for single carrier systems. For OFDM/OFDMA systems the receiver processing revolves around the FFT.

Figure 5:
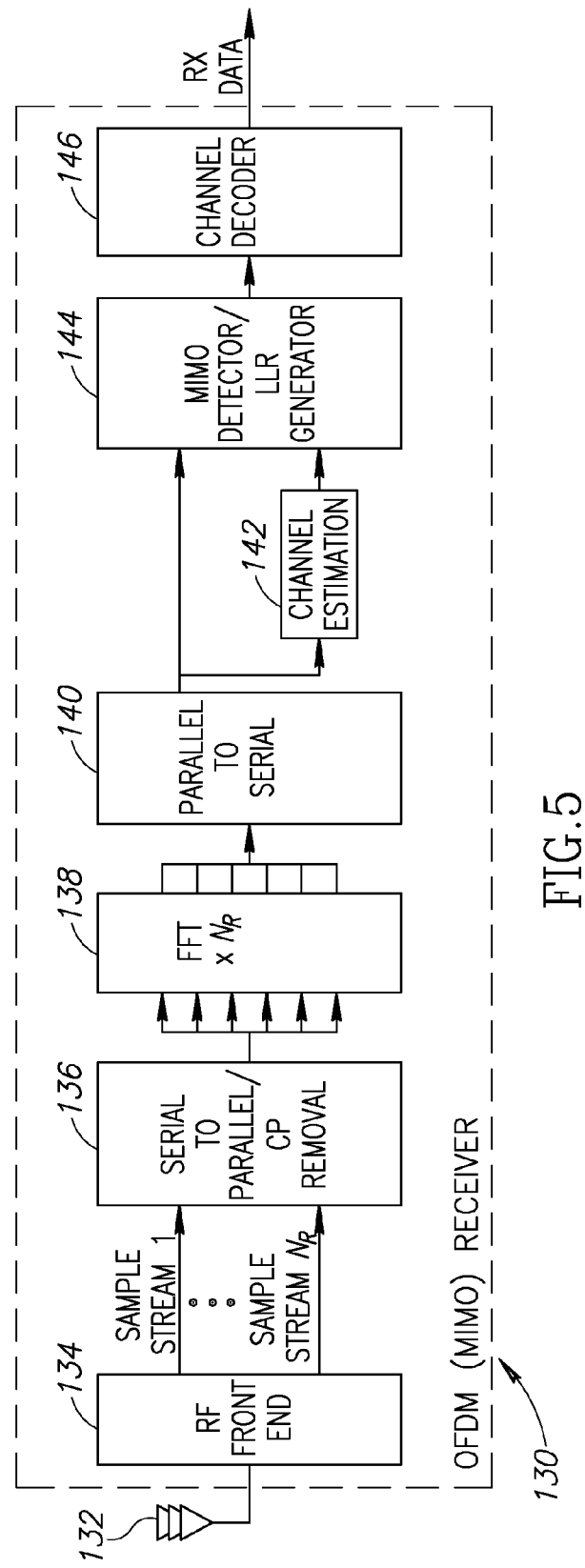
FIG. 5 is a block diagram illustrating an example OFDM receiver incorporating the MIMO detection mechanism of the present invention.

OFDM modulation has been incorporated into several wireless communication standards, including for example IEEE standards 802.11a and 802.11g. The IEEE 802.11n standard builds upon previous 802.11 standards by adding MIMO capabilities. Use of multiple transmit and receive antennas allows for increased data throughput through spatial multiplexing and increased range by exploiting the spatial diversity through coding schemes such as Alamouti coding. A high level block diagram of the baseband portion of an OFDM MIMO receiver is shown in FIG. 5. The MIMO based OFDM receiver, generally referenced 130, comprises an array of antennas 132, RF front end circuit 134, serial to parallel and cyclic prefix (CP) removal block 136, FFT×$N_R$ 138 ($N_R$ being the number of receive antennas), parallel to serial block 140, channel estimation block 142, MIMO detector and LLR generator 144 and channel decoder 146.

In operation, multiple signals are received by the antenna array 132 and input to the RF front end circuit which functions to convert the received broadband signals to baseband. The output of the RF front end circuit comprises a plurality of $N_R$ streams of samples. The samples are grouped into blocks and the cyclic prefix (CP) portion is removed. The vector of samples in the time domain is fed into $N_R$ fast Fourier transform (FFT) modules. The FFT outputs a vector of frequency domain samples, referred to as subcarriers. The channel estimation module estimates the channel response for all of the subchannels in use. The channel estimation is performed using known pilot signals embedded in the frequency domain vector. The MIMO detector/LLR generator module processes the channel estimates, the frequency domain vector and an estimate of the channel noise level. The output of the MIMO detector is a set of soft information associated with the confidence level of the constituent bits. In the examples presented herein, the soft information comprises log likelihood ratios (LLRs). It is appreciated that other soft information types may be generated as well. Finally, the LLRs are fed into a channel decoder which extracts the information bits from the LLRs of the coded bits.

It is important to note the differences between a MIMO OFDM system and a SISO OFDM system. Several significant differences exist between the SISO and the MIMO versions of an OFDM receiver. First, the MIMO receiver comprises $N_R$ ($N_R$=2 in a 2×2 MIMO system) FFT modules and $N_R$ corresponding reception chains which precede the FFT modules. Second, the MIMO channel estimation provides an estimated channel matrix response for each subcarrier rather than a set of channel scalar coefficients. Third, the MIMO detector/LLR generator is different from that of the SISO detector in that the number of LLRs in its output is different. Considering the MIMO receiver block diagram of FIG. 4, for a MIMO OFDM receiver, the receiver front-end block comprises a serial to parallel block, cyclic prefix removal block, FFT block and channel estimation block.

MIMO Transmission Method

The transmission method supported by the MIMO detector of the present invention will now be described. The transmission method described is often referred to as BLAST or MIMO matrix B (IEEE standard 802.16e). In this transmission method, a constellation symbol $s_1$ is transmitted over the first transmit antenna and a second, independent constellation symbol $s_2$ is transmitted over the second transmit antenna. Both these symbols are taken from a known signal constellation. The two signal constellations need not necessarily be the same. We denote the transmitted symbol vector by $s=(s_1,s_2)^T$.

Let us now formulate the problem of MIMO detection and begin by introducing several notations. A general MIMO system has $N_T$ transmit antennas and $N_R$ receive antennas. The equivalent model for this MIMO channel is given by the following $$z=Hs+n \quad (1A)$$

where
  z is the $N_R$-dimensional received vector;
  s is the $N_T$-dimensional transmitted symbol vector;
  n is the received noise vector (assumed to be with independent and identically distributed complex Gaussian entries);
  H is the $N_R \times N_T$ channel matrix response in which the (i,j)-element represents the response of the channel between the $j^{th}$ transmit antenna to the $i^{th}$ receive antenna;

The equation for the basic problem presented above in Equation 1A can be modified by multiplication by an $N_R \times N_R$ matrix T to yield the following $$\tilde{z}=Tz=THs+Tn=\tilde{H}s+\tilde{n} \quad (1B)$$

This transformation expressed in Equation 1B accounts for noise whitening, lattice basis reductions, preceding, etc.

Each one of the symbols is taken from a discrete signal set (i.e. constellation) S. Depending on the implementation, the transmitter may implement a pre-coding technique, namely: the transmitter may send the vector Ps where P is a pre-coding matrix (of size $N_T \times N_S$, where $N_S$ denotes the size of the symbol vector in the precoded system).

$$z=HPs+n \quad (2)$$

We can, however, denote HP by H and obtain the result in Equation 1A.

In particular, for a 2×2 antenna system, the MIMO problem can be expressed as $$\begin{bmatrix} z_1 \\ z_2 \end{bmatrix} = \begin{bmatrix} H_{11} & H_{12} \\ H_{21} & H_{22} \end{bmatrix} \begin{bmatrix} s_1 \\ s_2 \end{bmatrix} + \begin{bmatrix} n_1 \\ n_2 \end{bmatrix} \quad (3)$$

The hard decision detection problem then becomes finding the most likely transmitted vector s, given the received vector z, where the channel matrix H (or its estimate) is given, and the noise vector n is unknown. It can be shown that under the above-mentioned statistical assumptions, in conjunction with the assumption that all admissible vectors s are equiprobable, the optimum maximum likelihood (ML) detector gives the solution to the following optimization problem $$\hat{s} = \underset{\substack{s \in \text{set of valid vectors} \\ \text{(of constellation points)}}}{\operatorname{argmin}} \|z - Hs\|^2 \quad (4)$$

It can be shown that for QAM constellations, the solution of Equation 4 is closely related to the solution of the integer least squares (LS) problem, defined as $$\min_{s \in Z^m} \|z - Hs\|^2 \quad (5)$$

where $Z^m$ denotes an m-dimensional integer vector (m=2 for the 2×2 MIMO). Thus, the MIMO detection problem can be expressed as finding the least squares solution to a system of linear equations where the unknown vector takes on values from a known finite set of discrete points, but the coefficients of the equations and the given vector comprise real numbers. Note that in the problem defined herein, the vector s is a vector of complex-valued constellation points which takes on values from a finite subset of a translation of a scaled version the infinite lattice $\Lambda \subset Z^m$, i.e., $s \in \alpha Z^m + p$. When the vector $s \in Z^m$ is taken from an m-dimensional integer lattice or of its scaled translation, then the vector Hs, (s∈$Z^m$) is taken from a skewed lattice. It can also be shown that the integer LS problem finds the closest lattice point (in a Euclidean sense) to the received vector z.

If the constellation size is M (e.g., M=64 in a 64-QAM constellation) then the search in a SISO system is over a set of M elements and over a set of $M^2$ in a 2×2 MIMO detector. In general, the search problem for the closest lattice point where the lattice is infinite (s∈$Z^m$) is of a non-polynomial (NP) complexity. Even for a relatively low dimensional MIMO (e.g., m=4) problem with s taken from a 64-QAM constellation, the search is of a prohibitive complexity.

Soft Values Generation

Figure 6A:
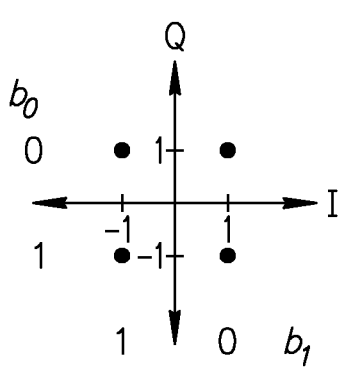
FIG. 6A is a diagram illustrating the QPSK constellation pattern of the IEEE 802.16 standard.
Figure 6B:
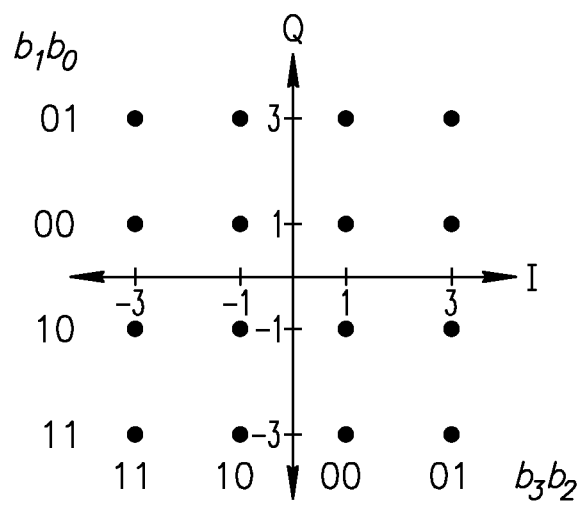
FIG. 6B is a diagram illustrating the 16-QAM constellation pattern of the IEEE 802.16 standard.
Figure 6C:
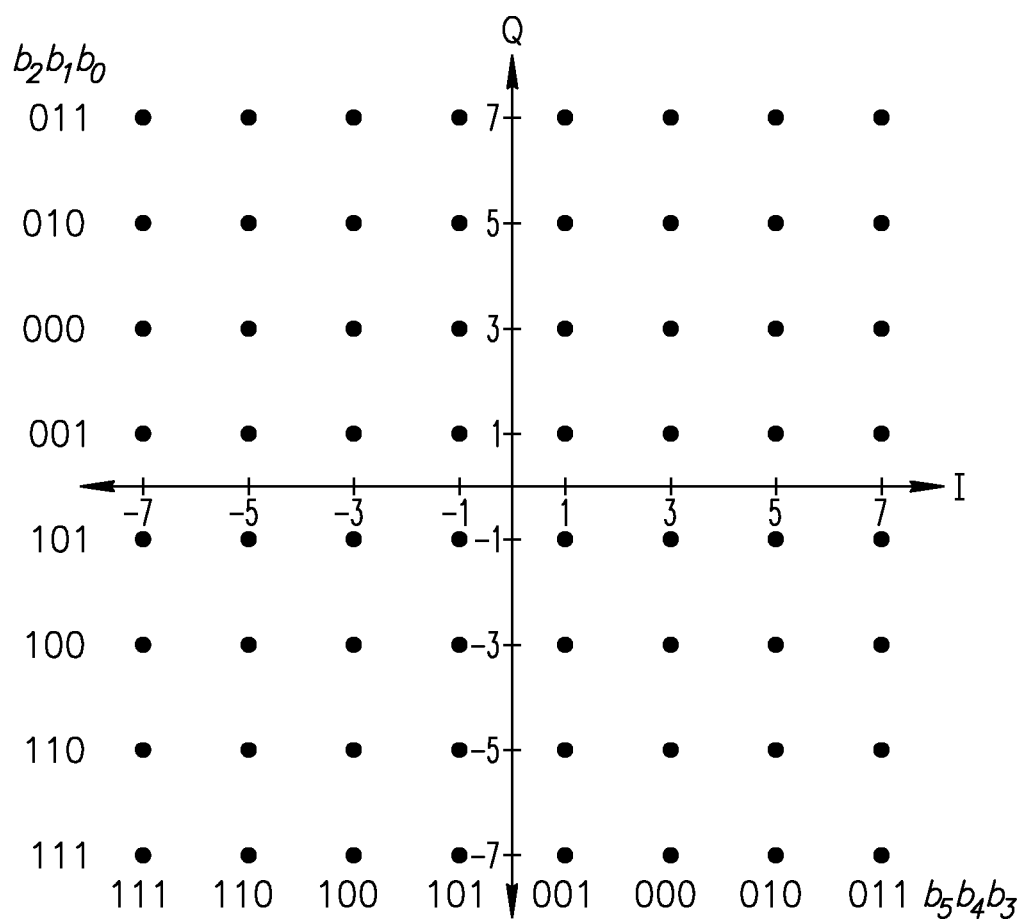
FIG. 6C is a diagram illustrating the 64-QAM constellation pattern of the IEEE 802.16 standard.

A constellation of M symbols represents $\log_2(M)$ bits. The one-to-one correspondence between the constellation points and input bit values is defined by a mapping of the constellation points as illustrated in FIGS. 6A, 6B and 6C, representing QPSK, 16-QAM and 64-QAM constellations, having gains of c=$1/\sqrt{2}$, c=$1/\sqrt{10}$ and c=$1/\sqrt{42}$, respectively. These Figures delineate the two-dimensional QAM constellations used in IEEE standard 802.16. For example, the 64-QAM constellation shown in FIG. 6C comprises 64 symbols organized in an 8×8 square. Each dimension takes on one of eight possible values $1/\sqrt{42} \cdot \{+/-1,+/-3,+/-5,+/-7\}$ wherein each value maps three bits. A symbol represents a mapping of a 6-bit tuple. In a digital communication system, the bit stream is segmented to blocks of bits where each block corresponds to a single symbol. Using the mapping rule of the constellation, each block of bits is converted to a constellation point conveyed over the channel. Considering the 64-QAM constellation for example, the bit sequence 000,110 is mapped to the constellation point 3-5j, using the convention that the first three bits correspond to the I component and the second three bits correspond to the Q component. It is noted that though the symbol error rate of a given detector does not depend on the bit mapping of the constellation points, the bit-error-rate performance depends highly on this mapping.

When a MIMO scheme is used in a coded communication system, the MIMO detector no longer generates decisions on the transmitted symbols but rather generates decisions based on a soft LLR metric per bit. This metric is indicative of the reliability of its decision regarding that particular bit. Thus, for each symbol taken from an M-symbol constellation, the detector generates $\log_2(M)$ LLR values for the constituent bits. This modification of the MIMO detector to generate LLRs and thus accommodate an overlying channel code is non-trivial and can potentially entail the majority of the complexity of the detector. In this case, it is not sufficient to just find the transmitted symbol vector with the minimum distance to the received signal. Rather, the detector must consider multiple hypotheses in order to generate the soft metric which quantifies the reliability of the hard decision on a bit by bit basis.

The soft value of bit $b_k$ is defined as $$L(k) := \log \frac{Pr\{b_k = 0|z\}}{Pr\{b_k = 1|z\}} \quad (6)$$

It can be shown that for a uniform a priori probability (i.e. Pr{$b_k$='0'}=Pr{$b_k$='1'}=0.5), the LLR can be approximated by the following formula $$L(k) \approx \frac{1}{2} \max_{s:b_k="0"} \left\{ -\frac{1}{\sigma^2} \|z - Hs\|^2 \right\} - \frac{1}{2} \max_{s:b_k="1"} \left\{ -\frac{1}{\sigma^2} \|z - Hs\|^2 \right\} \quad (7)$$

Equivalently, the following formula can be written $$L(k) \approx -\frac{1}{2\sigma^2}(-1)^{b_k(\hat{s})} \left[ \|z - H\hat{s}\|^2 - \min_{s:b_k=\bar{b}_k(\hat{s})} \|z - Hs\|^2 \right] \quad (8)$$

where $$\hat{s} = \arg\min_s \|z - Hs\|^2 \quad (9)$$

is the hard decision of the detector, $\sigma^2$ is defined as the noise variance, $b_k(\hat{s})$ is the value of bit k in $\hat{s}$ and $\bar{b}_k(\hat{s})$ denotes its opposite value. It is noted that the first term in the square braces in Equation 8 represents the difference between the hard decisions and the received symbols while the second term to the right of the minus sign represents the smallest distance having a bit of interest opposite to that of the corresponding bit of the hard decision.

MIMO Detection Methods

Linear Detectors:

An example of a relatively simple semi-optimal, low complexity class of detectors is linear detectors, e.g., zero forcing, minimum mean squared error. These detectors are based on multiplication of the received vector z by the generalized inverse of the channel matrix response or a variant thereof. The result of this multiplication, however, usually yields a vector whose elements are not valid constellation points. Therefore, the multiplication result is rounded off to the nearest constellation point. Due to this rounding the resulting decision is not guaranteed to be optimal.

The zero forcing (ZF) detector is defined as $$\tilde{s} = H^\# z = (H^H H)^{-1} H^H z \quad (10)$$

where $H^\#$ is the pseudo-inverse of H.

The minimum mean squared error (MMSE) detector is another linear detector defined as the following $$\tilde{s} = \left( H^H H + \frac{\sigma_n^2}{\sigma_s^2} I \right)^{-1} H^H z \quad (11)$$

where $\sigma_n^2$ and $\sigma_s^2$ represent the noise and signal variances, respectively. The ZF and MMSE detectors can be regarded as the solutions of the unconstrained least squares problem $$\min_{s \in R^m} \|z - Hs\|^2 \quad (12)$$

where $R^m$ denotes the m-dimensional real space. Since the entries of $\tilde{s}$ will not necessarily be integers (in both solutions), these values are rounded to the nearest point in the constellation L to obtain $$\hat{s} = [\tilde{s}]_L \quad (13)$$

In lattice theory, the above solution for the ZF detector is often referred to as the Babai estimate. While the MMSE solution uses knowledge on the SNR (as reflected by $\sigma_n^2/\sigma_s^2$) the ZF solution does not (or implicitly assumes a high SNR). Note that the difference between the LS problem in Equation 3 and the integer LS in Equation 5 is the constraint on the integer values of s (or the constraint to a discrete finite set of values). The relaxation of this constraint simplifies the problem from a non-polynomial (NP) complexity search problem to a mere matrix multiplication. The linear solutions (i.e. ZF and MMSE), however, incur prohibitive performance degradation with respect to the ML detector.

Successive Interference Cancellation (SIC) Detector:

In a successive interference cancellation (SIC) detector, the vector s is detected element by element. After an element is detected/decoded its contribution to the received vector is cancelled out. The detection order of the elements of s is optimized according to some criterion. It is noted that this is the method proposed for the V-BLAST scheme. In this detector, the ZF or MMSE estimate is used for only one of the entries of s, e.g., its first element $s_1$. This entry is detected, and its effect is cancelled out to obtain a reduced-order integer least squares problem with m-1 unknowns. This process is repeated to find the next entry, e.g., $s_2$. This procedure, however, suffers from error propagation. That is, decision errors may have an adverse effect on the estimation of the subsequent unknowns from which the decision is cancelled out. In order to mitigate the effect of error propagation it is advantageous to carry out the nulling from the strongest symbol to the weakest symbol.

In particular, in a 2×2 MIMO system, this detector recovers the first element (e.g., $s_1$) by multiplying the received vector by a row vector followed by a rounding operation. Then, the resulting value of $s_1$ is inserted into Equation 3. The equation set in Equation 3 can be reduced to one equation with one unknown $s_2$. Then, $s_2$ can be linearly detected by multiplication and rounding. The performance of the SIC detector is inferior with respect to the ML detector.

The SIC detector is usually simplified by use of a pre-processing operation called the QR decomposition. The MIMO detector of the present invention employs this decomposition. QR decomposition reduces the equation system of Equation 3 to an equivalent triangular form which maintains the relevant information of the original system. This transformation is invertible and information lossless. The triangular form of the decomposition is as follows $$\begin{bmatrix} y_1 \\ y_2 \end{bmatrix} = \begin{bmatrix} R_{11} & 0 \\ R_{21} & R_{22} \end{bmatrix} \begin{bmatrix} s_1 \\ s_2 \end{bmatrix} + \begin{bmatrix} \tilde{n}_1 \\ \tilde{n}_2 \end{bmatrix} \quad (14)$$

Or in a matrix form as follows $$y = Rs + \tilde{n} \quad (15)$$

The transformation from Equation 1 to Equation 15 is based on the decomposition H=QR, where R is a triangular matrix and Q is a unitary matrix, i.e., $Q^H Q = I$. Using this convention yields $y = Q^H z$, and $\tilde{n} = Q^H n$. Using the above representation, the 2×2 MIMO detection problem reduces to the following $$\hat{s} = \underset{\substack{s \in \text{set of constellation} \\ \text{points vectors}}}{\operatorname{argmin}} \|y_1 - R_{11}s_1\|^2 + \|y_2 - R_{21}s_1 - R_{22}s_2\|^2 \quad (16)$$

It is this lower triangular representation that is subsequently used. An upper triangular form of the decomposition is also common and is given in the following equation $$\begin{bmatrix} y_1 \\ y_2 \end{bmatrix} = \begin{bmatrix} R_{11} & R_{12} \\ 0 & R_{22} \end{bmatrix} \begin{bmatrix} s_1 \\ s_2 \end{bmatrix} + \begin{bmatrix} \tilde{n}_1 \\ \tilde{n}_2 \end{bmatrix} \quad (17)$$

The particular form of decomposition is not critical to the invention. The MIMO detector of the present invention uses the lower triangular form but can accommodate the upper triangular form using a simple transformation. Let us denote the swapping transformation by T $$T = \begin{bmatrix} 0 & 1 \\ 1 & 0 \end{bmatrix} \quad (18)$$

Then, given an upper triangular representation as follows $$y_U = R_U s_U + \tilde{n}_U \quad (19)$$

One can switch to an equivalent lower triangular representation using the following transformation $$y_L = R_L s_L + \tilde{n}_L \quad (20)$$

where $$y_L = T y_U, \ R_L = T R_U T, \ s_L = T s_U, \ \tilde{n}_L = T \tilde{n}_U \quad (21)$$

Sphere Decoding:

The sphere decoding (SD) algorithm seeks to solve the following optimization problem $$\min_{s \in Z^m} \|z - Hs\|^2 \quad (22)$$

$$\text{Subject to } \|z - Hs\|^2 \le D^2$$

Figure 7:
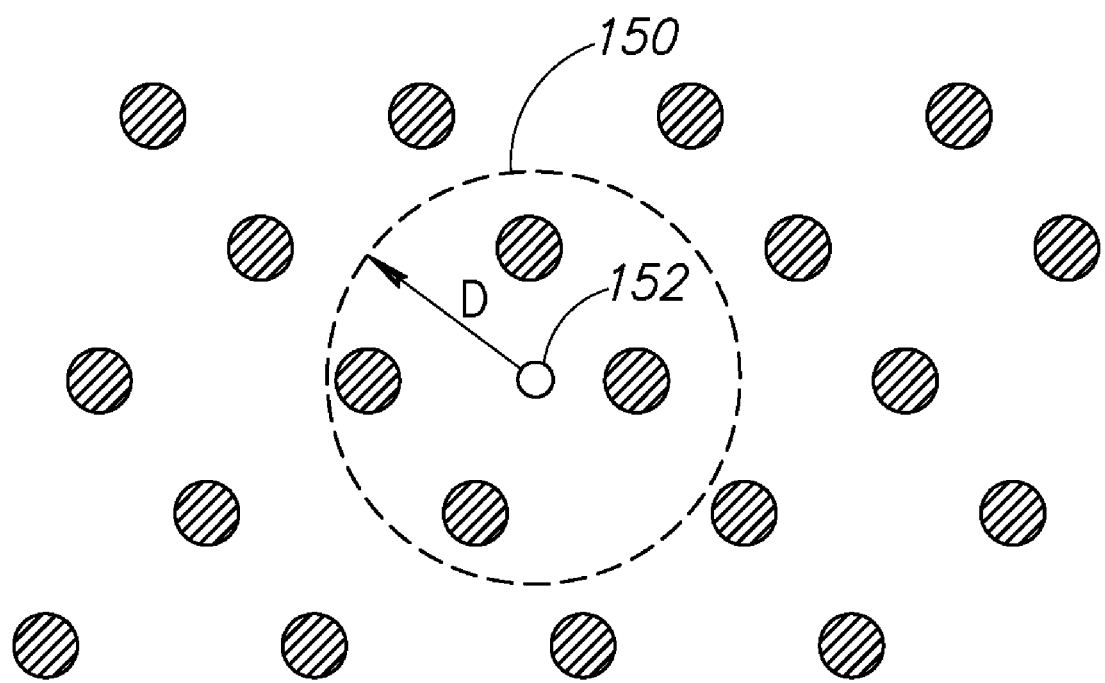
FIG. 7 is a diagram illustrating an example of searching for a lattice point in accordance with the prior art sphere decoding algorithm.

The SD algorithm searches for the nearest lattice point within a multidimensional sphere centered at the received signal z and whose radius is D, thus reducing the search space and hence the required computations. A diagram illustrating an example of searching for a lattice point in accordance with the prior art sphere decoding algorithm is shown in FIG. 7. The received signal z 152 is at the center of a sphere 150 having a radius D which defines the search space.

Note that the nearest lattice point inside the sphere is also the nearest lattice point for the entire lattice. When D is too large too many points are obtained, whereas if D is too small no points inside the search sphere are obtained. If the SD algorithm fails to find a solution in the prescribed region (i.e. sphere), either (1) the search region is increased until a solution is found, yielding a search algorithm with prohibitive complexity in the worst case, but with polynomial complexity in the average case or (2) a detection error is reported, degrading overall performance, but putting a bound on the complexity of the algorithm.

The metric calculation in the algorithm is also based on a triangular representation of the MIMO detection model. Without loss of generality, we assume a lower triangular representation of the form $$\begin{bmatrix} y_1 \\ y_2 \\ \vdots \\ y_{m-1} \\ y_m \end{bmatrix} = \begin{bmatrix} R_{11} & 0 & 0 & \ldots & 0 \\ R_{21} & R_{22} & 0 & \ldots & 0 \\ \vdots & \vdots & \vdots & \vdots & \vdots \\ R_{m-1,1} & R_{m-1,2} & \ldots & R_{m-1,m-1} & 0 \\ R_{m,1} & R_{m,2} & \ldots & R_{m,m-1} & R_{m,m} \end{bmatrix} \begin{bmatrix} s_1 \\ s_2 \\ \vdots \\ s_{m-1} \\ s_m \end{bmatrix} + \begin{bmatrix} \tilde{n}_1 \\ \tilde{n}_2 \\ \vdots \\ \tilde{n}_{m-1} \\ \tilde{n}_m \end{bmatrix} \quad (23)$$

This decomposition is used to decompose the aggregate metric (i.e. distance) as a sum of partial distances. The accumulated distance at layer k is defined as the aggregate distance induced by the first k equations in the lower triangular equation set $$D_k = \sum_{n=1}^{k} \left\| y_n - \sum_{j=1}^{n} R_{n,j} s_j \right\|^2 = D_{k-1} + \left\| y_k - \sum_{j=1}^{k} R_{k,j} s_j \right\|^2 \quad (24)$$

In particular, for a 2×2 MIMO system, the total distances can be written as follows $$\|y_1 - R_{11}s_1\|^2 + \|y_2 - R_{21}s_1 - R_{22}s_2\|^2 \quad (25)$$

Sphere decoding is based on the idea that though it is rather difficult to determine the lattice points inside a general m-dimensional sphere, it is relatively easy to do so in a one-dimensional sphere. In this case, the 1D-sphere reduces to the endpoints of the interval and the desired lattice points are the integer values within this interval. This idea carries over to higher dimensions. For any k-dimensional lattice point that lies in a sphere of radius D, the set of admissible extensions of the $(k+1)^{th}$ coordinate that lie in a higher dimensional sphere of the same radius forms an interval. That is, all of the m-dimensional lattice points that lie in a sphere of radius D are determined by successively finding all lattice points in spheres of lower dimensions 1, 2, ..., m−1 and of the same radius. The SD algorithm constructs a tree in which the branches of the $k^{th}$ level of the tree correspond to the lattice points inside the sphere of radius D and dimension k. Thus, each such branch corresponds to a partial symbol vector with only k out of the m symbols. The complexity of the algorithm is not constant but rather depends on the size of the tree, i.e. on the number of lattice points visited by the algorithm. Similar to SIC, a column reordering strategy for the channel matrix response should be incorporated into the reduction process of the algorithm in order to improve its performance. Furthermore, in sphere decoding, such a re-ordering process also changes the computational cost of the algorithm.

The main principles of the algorithm are the following:
1. In a Pre-Processing stage, the lattice induced by the channel matrix H is transformed into an equivalent representation. This is often implemented in two steps: (1) a lattice reduction (i.e. integer reduction) and (2) QR decomposition. The QR decomposition is necessary to break the problem into sub-problems of decreasing dimension as described supra. The result is should be a triangular matrix. Geometrically, this decomposition is equivalent to a rotation of the coordinate system of the problem.
2. After the lattice is represented by a triangular matrix, the SD algorithm proceeds according to the following steps:
   a. For the first layer, all the possible values of the symbol associated with this layer which reside in a sphere (for all possible values of the rest of the layers) are enumerated. Clearly, this set comprises all of the values $s_1$ which meet the sphere constraint:

$$D_1 = \|y_1 - R_{11}s_1\|^2 \leq D^2 \quad (26)$$

b. For the next layer k, each candidate point from the previous layer $s_{k-1}(i) = [s_1(i), s_2(i), \ldots, s_{k-1}(i)]$ which obeys the sphere constraint is expanded by one additional symbol. All the values of the current layer, i.e., of $s_k$ which obey the sphere constraint are found.

$$D_k(l) = D_{k-1}(i) + \left\| y_k - \sum_{j=1}^{k} R_{k,j} s_j(i) \right\|^2 \leq D^2 \quad (27)$$

where l denotes the enumeration of the candidates at the $k^{th}$ layer and $D_k(l)$ represents the aggregate distance of the $l^{th}$ candidate point at the $k^{th}$ level which is derived by expanding the $i^{th}$ candidate $s_{k-1}(i) = [s_1(i), s_2(i), \ldots, s_{k-1}(i)]$ of the previous layer by a concrete value of the symbol $s_k$. The set of candidate points obtained by expanding the point $s_{k-1}(i)$ will reside in a sphere around $s_{k-1}(i)$ with a radius that depends on the value of this lattice point, namely $\sqrt{D^2 - D_{k-1}(i)}$. If the sphere is empty the algorithm moves to the next candidate point $s_{k-1}(i)$ and expands it by all of the possible values of the next symbol which again admit the sphere constraint.
   c. When the last layer is reached, and more than one lattice point was found inside the sphere, the algorithm makes a decision of the lattice point with the smallest Euclidian distance from the received vector.

Note that the sphere radius D can be chosen to be the covering radius of the lattice, defined as the smallest radius of spheres centered at the lattice points that cover the entire space. The problem with this value of D, however, is that the problem of determining the covering radius of a given lattice is itself non-polynomial complex. Several practical alternatives for this selection include: (1) setting the radius a priori, such as in accordance with an SNR measurement or by the distance between the received vector and the MMSE decision; (2) starting with a large value and then reducing it according to the distance of the first detected point; and (3) starting from a small radius and then increasing it if the sphere is empty.

One variation of the algorithm is the Pohst sphere decoder which is operative to visit the lattice points in each layer in an ascending order. The Schnorr-Euchner (SE) search strategy goes through all points according to non-decreasing distance from the previous lattice point. This order of consideration is advantageous when the sphere radius is continuously reduced according to the nearest point found so far. With the SE algorithm, the chance of finding the nearest signal point early is maximized.

Sphere decoding does preserve the optimality of the ML algorithm but only when it is properly parameterized. In its original version, it is a variable-complexity algorithm that reduces the complexity of the ML algorithm. Constant-complexity variants of this algorithm, which are more suitable for hardware implementation, are not optimal.

Expansion of the Search Tree:

The sphere decoding algorithm and its variants entail expansion of a list of candidates which is a subset of the entire set of symbol vectors. One method for spanning the search tree is the depth first search which spans the tree to the last layer and then goes back to expand other nodes. Another method is the breadth first search in which the tree is spanned fully for each layer before the next one is visited. For hardware implementations of the invention, the breadth first method is preferred.

One method of reducing the search node list is the K-best algorithm which is similar to the M-algorithm in sequential decoding. The K-best algorithm maintains only K active hypotheses in every layer of the tree. It is possible to take the K-best paths (according to the best metric) with, or without a sphere constraint (which can yield fewer than K surviving paths). Note that taking K-best with K=1 and no sphere constraint, using the SE method yields the SIC solution described supra. The performance of the K-best algorithm is close to that of the ML algorithm if K is sufficiently large.

An individual iteration of the K-best algorithm used in a system with more than two antennas will now be described. According to the K-best algorithm, the final search of the vector s is not over the complete set of valid vectors (which is of cardinality $M^m$, where $m=N_T$ is the number of receive and transmit antennas, and M is the constellation size), but rather over a subset of cardinality K. Likewise, the K-best algorithm is a breadth-first algorithm. It maintains at most K candidates at each layer of the tree.

The subset K is built in a recursive manner. For convenience of notation, we assume that the expanded tree starts with $s_1$ and ends in $s_k$ (at the $k^{th}$ layer of the expansion tree). The output of the first layer contains K candidates for $s_1$, the output of the $i^{th}$ layer has K candidate vectors each containing k elements: $s_k(i)=[s_1(i), s_2(i), \ldots, s_k(i)]$, $i=1, 2, \ldots, K$. Finally, the last stage results in a set of K complete candidate vectors $s(i)=s_k(i)=[s_1(i), s_2(i), \ldots, s_k(i)]$. From this set, the vector having the best metric is declared as the hard decision and the remainder of the elements in the set are used to calculate the bitwise LLRs as described in more detail infra.

Figure 8:
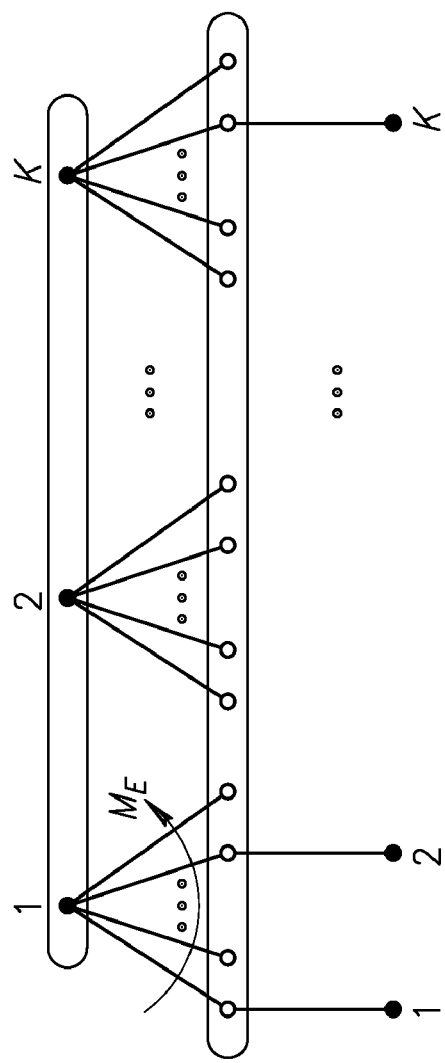
FIG. 8 is a diagram illustrating a step of the K-algorithm.
Figure 8:
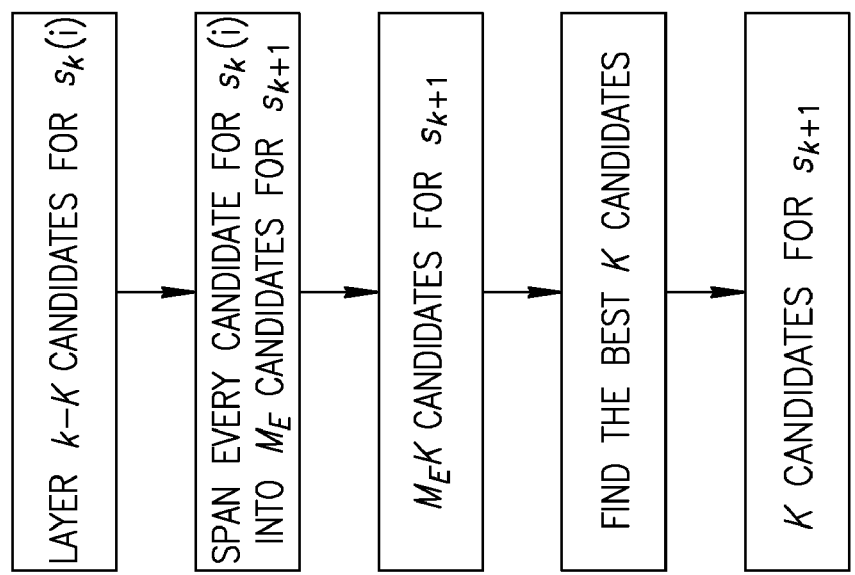

A diagram illustrating a step of the K-algorithm is shown in FIG. 8. At each stage or layer, the algorithm starts with K candidate vectors $s_k(i)=[s_1(i), s_2(i), \ldots, s_k(i)]$, $i=1, 2, \ldots, K$ to produce K vectors $s_{k+1}(i)=[s_1(i), s_2(i), \ldots, s_{k+1}(i)]$, $i=1, 2, \ldots, K$. At each stage, each one of the K candidate vectors $s_k(i)$ is expanded with all possible values of $s_{k+1}$ (or an M-element subset of all possible values or those obeying some constraint, e.g., the sphere constraint), resulting in a larger set of candidates, such as $K \cdot M_E$ candidates. In particular, when the candidates are expanded by all of the possible values of the following symbol then $M_E=M$. Thereafter, this set is reduced to K elements by choosing the best K out of the augmented set of candidates, i.e. the vectors having the best (i.e. smallest) metrics.

Figure 9:
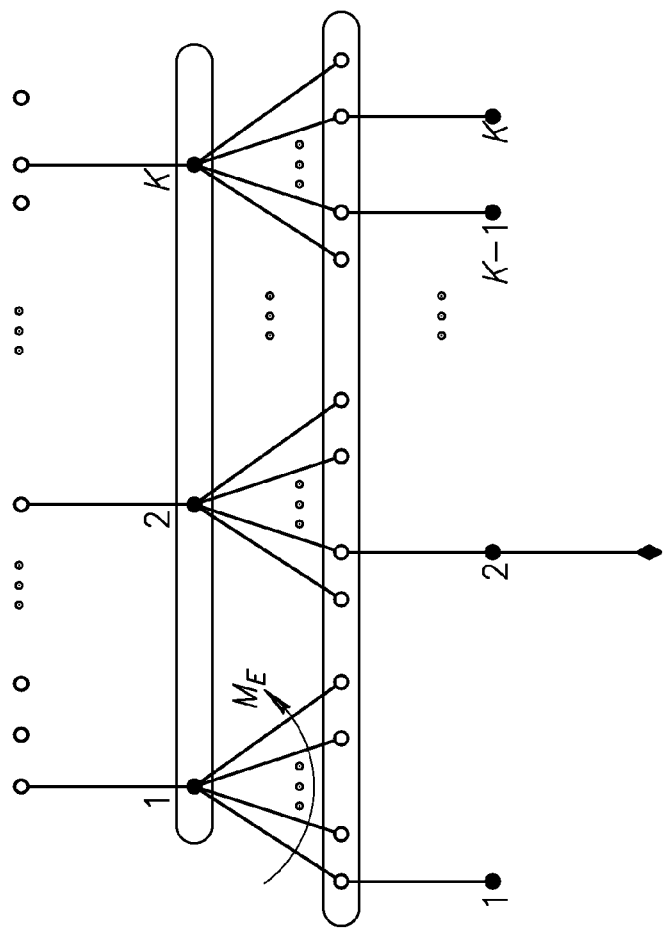
FIG. 9 is a diagram illustrating the K-best algorithm for a 2×2 MIMO detector.
Figure 9:
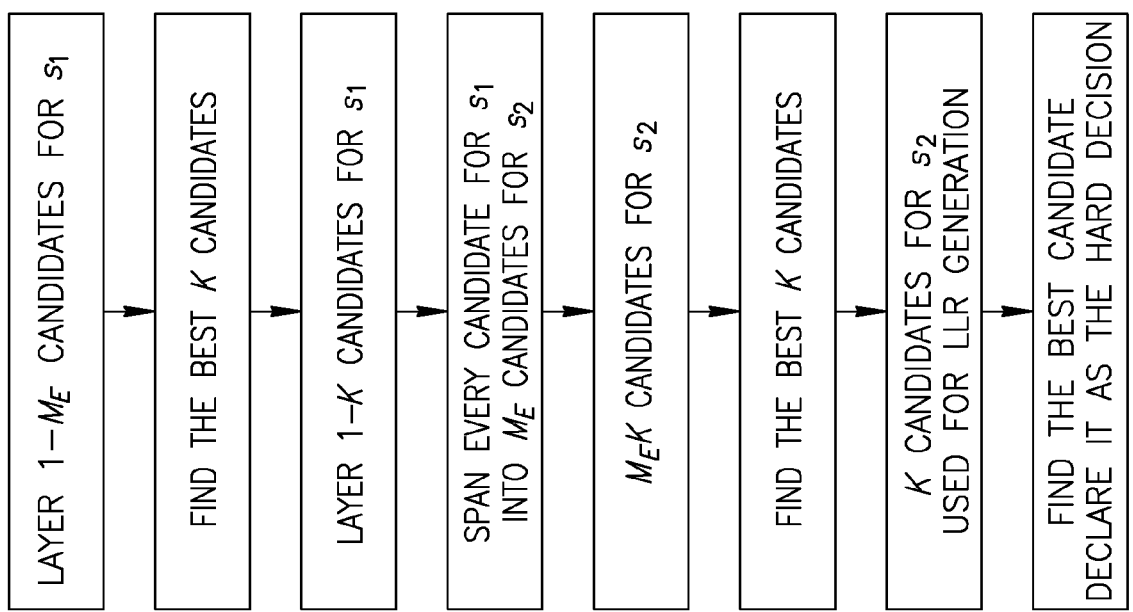

The expansion of the search tree according to the K-best algorithm for a 2×2 MIMO system is illustrated in FIG. 9. In this case, the expansion includes only two stages (or layers). In the first stage, K candidates for one of the two symbols are chosen. In the following stage, each one of the candidates is expanded to a symbol pair $s_2(i)=[s_1(i), s_2(i)]$. This expansion results in a larger set of candidates. For example, expanding each of the candidates to a subset of $M_E$ candidates results in $M_E K$ candidates. These candidates need to be sorted and pruned in order to reduce the list size back to size K. The best candidate among the K candidates is then found and referred to as the hard decision.

Soft Output MIMO Detectors

The detection algorithms described supra only provide the hard decision. The generation of log likelihood ratios (LLRs) requires an additional search for the right-hand side term in Equation 8. One search method known in the art is the list search which requires maintaining a list of candidate lattice points visited during the search and looking for the best one with an opposite corresponding bit. The disadvantage of this method is that it requires holding very long lists. The list sphere decoding (LSD) algorithm requires modifications whereby (1) every time it finds a point inside the initial radius D, it does not update the radius to the new distance; (2) it adds the new point to the list, provided that the list is not full; (3), it otherwise compares the distance of this point with the largest distance stored in the list and replaces the corresponding point if the new point has a smaller distance.

The K-best algorithm also maintains a list of candidates and generates LLRs by the distances of these K hypotheses. The disadvantage of these list-based methods is that in many cases distances associated with symbols with an opposite bit do not appear in the K hypotheses. The K-best fully extended paths tend to be similar to each other in the sense that they all have the same bit decisions as the winning path for a number of bit locations. Thus, the LLR for these bit locations cannot be reliably assessed. One possible solution to this problem is to assign a constant (i.e. large) value to the LLRs of these bits. When a large number of bits, however, are assigned such a large value, which is the case when a small candidate list K is used, significant degradation of channel performance is observed. Thus, it is thus crucial to consider discarded paths in computing LLRs.

Simplified Tree Search Using a One Stage Expansion

Figure 11:
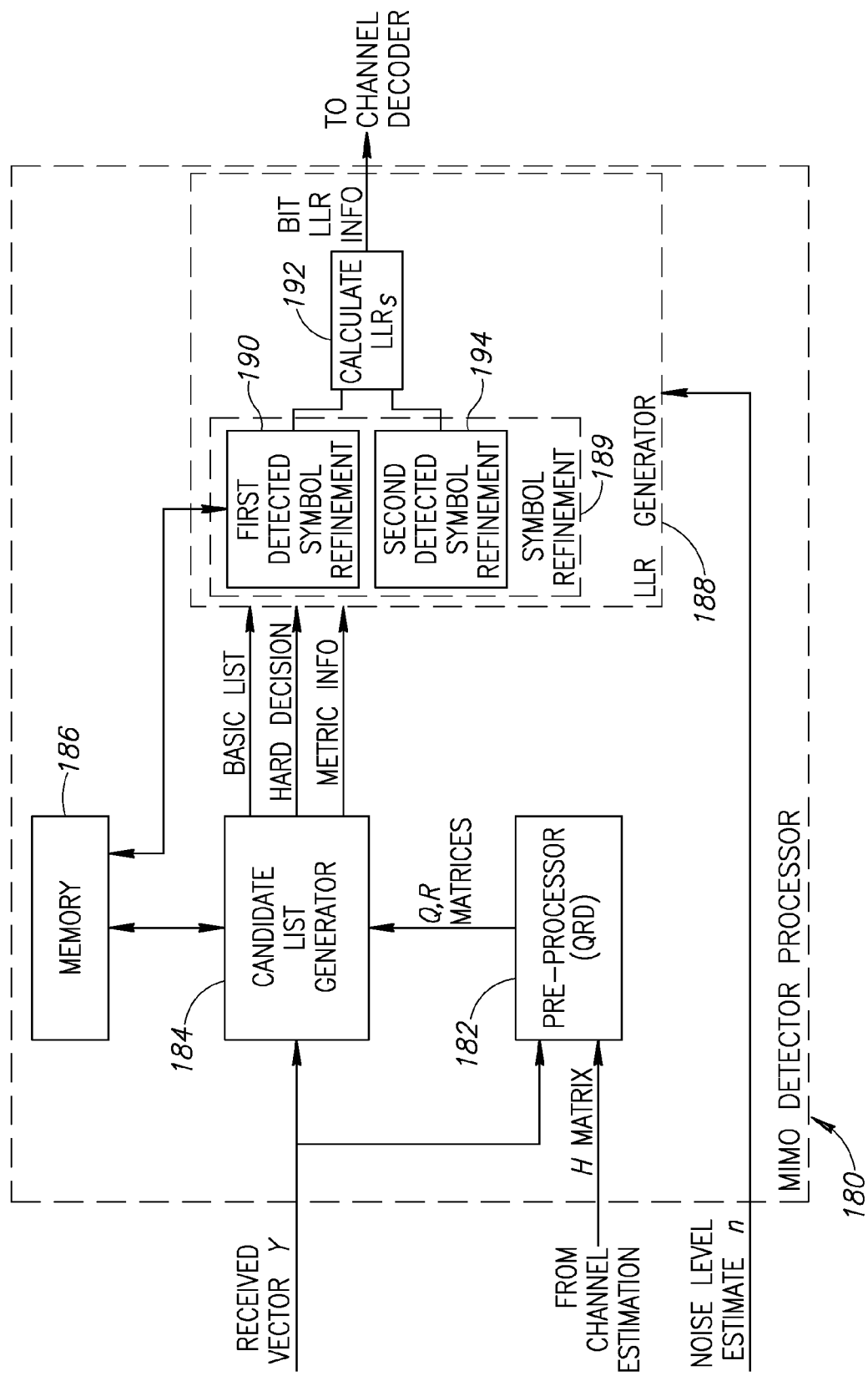
FIG. 11 is a block diagram illustrating the MIMO detector processor of the present invention in more detail.

A general block diagram of a MIMO detector constructed in accordance with the present invention used in a coded communication system is shown in FIG. 11. The detector, generally referenced 180, comprises a pre-processor 182 candidate list generator 184, memory 186, and LLR generator 188. The LLR generator comprises a symbol refinement block 189 and LLR calculation block 192. In the example embodiment presented herein, the symbol refinement block comprises a first detected symbol refinement block 190, second detected symbol refinement block 194. Note that alternatively, the simplified tree search mechanism of the invention may be applied to the received symbols without the benefit of any refinement rounds (i.e. without refinement block 189) or with a symbol refinement scheme that is well-known in the art.

The functionality of the MIMO detector is divided into three basic subunits. The pre-processor subunit 182 functions to perform lattice basis reduction (optional) and transform the received signal and the channel matrix response into a different equivalent representation, typically using well-known QR decomposition techniques. The pre-processing subunit also determines the detection order of the transmitted symbol vector. The candidate list generator subunit is the central core of the MIMO detector. This subunit functions to generate a hard decision and also generates a list of candidate symbol vectors, referred to as the basic list. This basic list is a subset of the set of all possible transmitted symbol vectors. The members of this subset are characterized by having a relatively small Euclidean distance to the received signal vector. This basic list is used by the LLR generator subunit which functions to produce the LLR values of the individual constituent bits using Equation 8 above.

The following three figures of merit distinguish different MIMO detectors from each other (1) their complexity, (2) the size of the candidate size and (3) the quality of the candidate list generated. The candidate list quality can be characterized by two figures of merit: the metrics of the candidates and the diversity of the bits in the list. The first figure of merit stems from the objective that the members of the candidate list should reside in a relatively small Euclidean distance from the received signal. This infers that their metrics should be close to the smallest observed metric (i.e. the hard decision). The second figure of merit stems the fact that in order to generate reliable LLR values, the candidate list generator must maintain candidate symbols with a large variety of bit mappings. This set of bit mappings preferably comprises both settings ('0'/'1') for almost every bit location. The degree of variety in the values of the bits is referred to by the term diversity.

The mechanism of the present invention is applicable to communication systems employing 2×2 MIMO techniques such as implemented by the example MIMO detector shown in FIG. 11 described above. It provides an efficient search routine for the candidate signal points in a 2×2 MIMO detection system. The mechanism enables a significant reduction in the number of signal points visited and in the size of the candidate list maintained. The reduction in complexity is obtained by the use of a one-stage expansion of the search tree rather than a two-stage expansion as is performed by prior art techniques.

As described supra, the prior art K-best algorithm and other list-based breadth-first algorithms are operative to carry out an expansion of the search list for every single layer (or dimension) of the transmission and to select a subset of the best candidates placed in this search list. Consequently, K elements are maintained after each sorting stage. At the beginning of the subsequent stage, each retained element (i.e. symbol) is extended to $M_E$ contender symbol vectors, resulting in $K \cdot M_E$ candidate symbol vectors. These symbol vectors are sorted according to their accumulated cost and reduced once again to a K-element list containing the best K elements in the extended search list. A detector for a 2×2 MIMO system thus comprises two stages. In the first stage, one of the two symbols is expanded and in the second stage, the second symbol is expanded.

In accordance with the present invention, a far simpler expansion of the candidate list is provided that is effective for both soft and hard decision purposes. Recalling the metric (i.e. distance) formula of Equation 25, the hard decision is the solution of the following optimization problem $$(\hat{s}_1, \hat{s}_2) = \underset{s_1, s_2}{\mathrm{argmin}}\{\|y_1 - R_{11}s_1\|^2 + \|y_2 - R_{21}s_1 - R_{22}s_2\|^2\} \quad (28)$$

rephrasing Equation 28 yields the following $$\underset{s_1, s_2}{\min}\{\|y_1 - R_{11}s_1\|^2 + \|y_2 - R_{21}s_1 - R_{22}s_2\|^2\} = \quad (29)$$

$$\underset{s_1}{\min}\left\{\|y_1 - R_{11}s_1\|^2 + \underset{s_2}{\min}\|y_2 - R_{21}s_1 - R_{22}s_2\|\right\}^2$$

Figure 13:
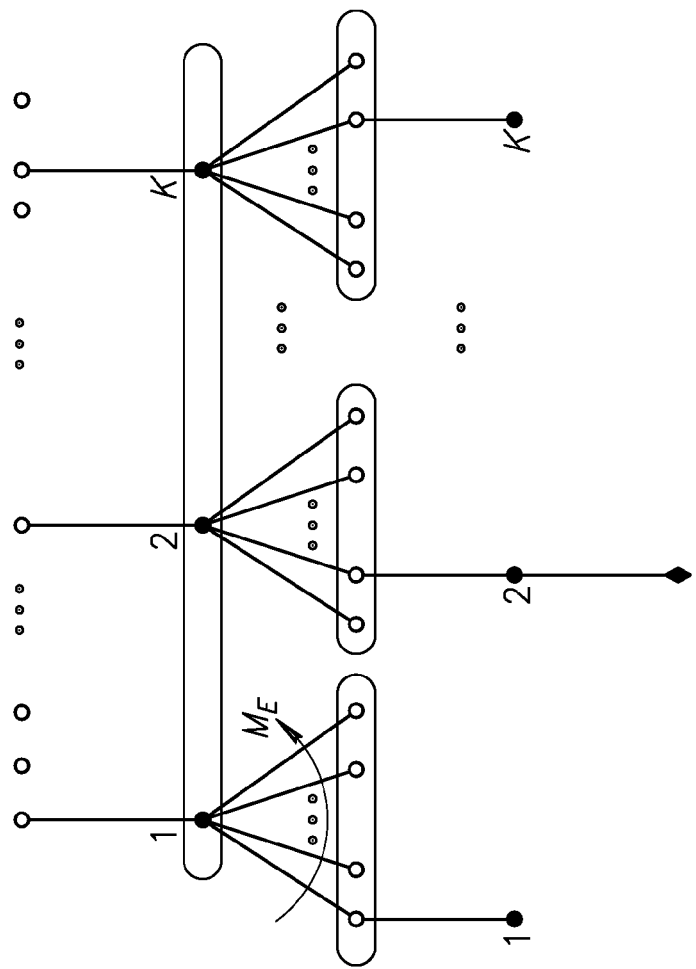
FIG. 13 is a diagram illustrating the candidate list generation method of the present invention for a 2×2 MIMO system.
Figure 13:
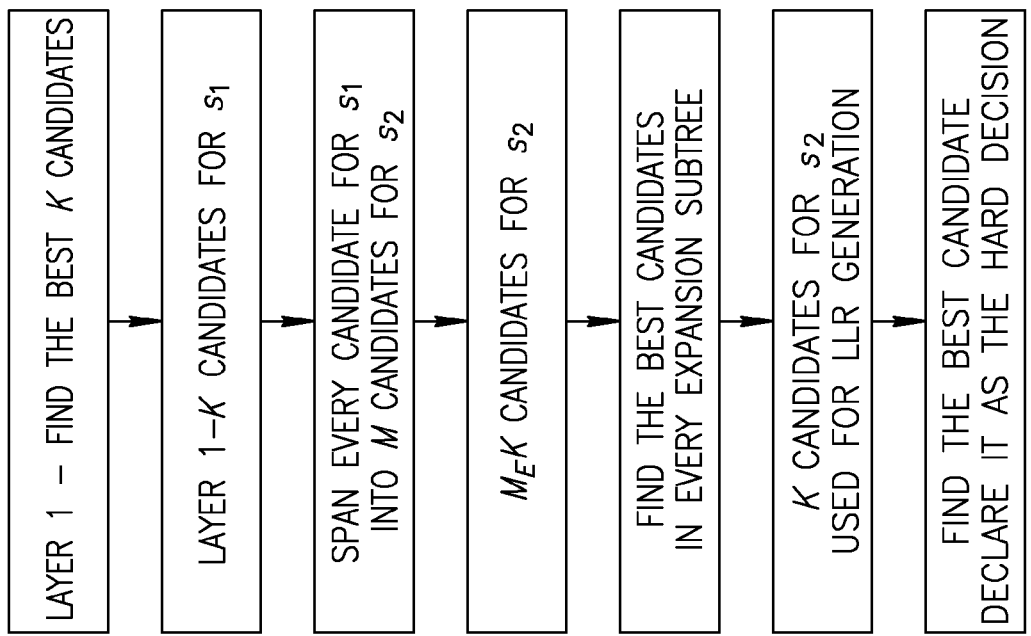

This derivation implies that for every candidate of $s_1$ only one candidate for $s_2$ is considered for the purpose of hard-decision decoding. Consequently, this value of $s_2$ is found by a simple search in the sub-tree rooted in $s_1$ without the need to search for the best candidate among the $K \cdot M_E$ expanded branches. A diagram illustrating this search technique of the present invention for a 2×2 MIMO system is shown in FIG. 13. The optimum solution of Equation 29 is equivalent to choosing the best element from a long list of $K \cdot M_E$ elements in two stages. In the first stage, the best element in each ($M_E$-entry) sub-list is chosen and then the global best optimal element is chosen from among the union of all of the best elements in the sub-lists.

The technique is operative to generate a candidate list for storing K candidates. A diagram illustrating the structure of the list of contender symbol pairs is shown in FIG. 12. The candidate list, generally referenced 210, comprises K entries 212, wherein each entry comprises a symbol vector s having a symbol for $s_1$ and a symbol for $s_2$ and the value of a cost function (or metric) such as the Euclidean distance between the candidate symbol vector to the received vector z. Alternatively, the list of contender symbols 210 may comprise the bit representation of the symbols instead of the symbols themselves. This alternative data structure may be found more useful for LLR calculation purposes.

Figure 10:
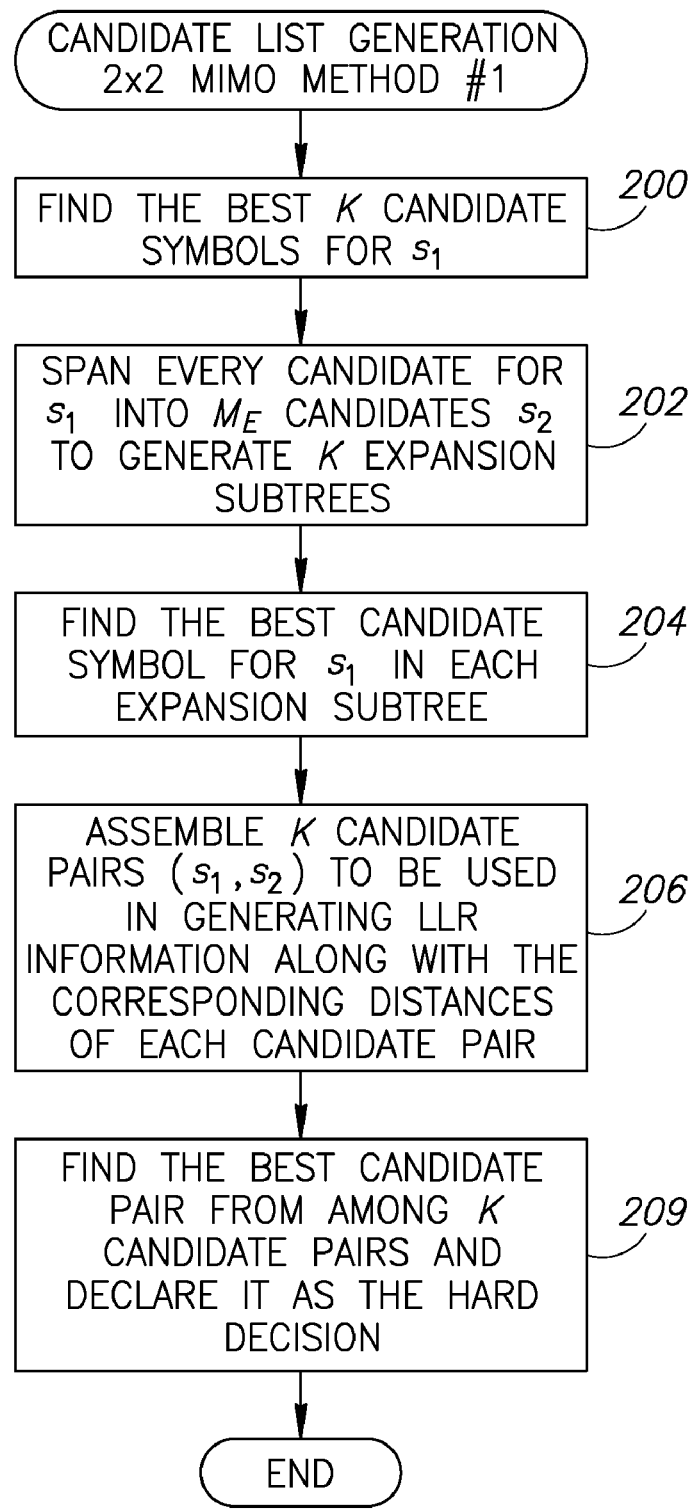
FIG. 10 is a flow diagram illustrating a first candidate list generation method of the present invention.

A flow diagram illustrating a first candidate list generation method of the present invention is shown in FIG. 10. Note that this method is implemented by the candidate list generator 184 (FIG. 11) described supra. With reference to FIGS. 10, 12 and 13, the first step is to find the best K candidate symbol pairs for $s_1$ (step 200). This is done using any suitable technique such as exhaustive search, binary search, etc. In one embodiment, the K best values for the first symbol $s_1$ are chosen as the set of K distinct values of $s_1$ which substantially minimizes the expression $\|y_1 - R_{11}s_1\|^2$ where $s_1$ denotes the first symbol candidate, $y_1$ denotes a received first symbol after QR decomposition and $R_{11}$ denotes a channel estimate after QR decomposition.

Once the K best candidate symbols for $s_1$ are found, the method then spans every candidate for $s_1$ into $M_E$ candidates for $s_2$ to generate K expansion trees (step 202). Then the best candidate symbol for $s_2$ is found within each expansion sub-tree (step 204). The resultant K candidate symbol pairs ($s_1$, $s_2$) are stored in the table along with the corresponding Euclidean distances (i.e. costs) of each candidate pair as shown in FIG. 12 to yield the basic candidate list (step 206). The contents of this list are subsequently used to generate soft value information (i.e. LLRs). The best candidate symbol pair from among all K candidate symbol pairs is found and declared the hard decision (step 209). Note, once the basic candidate list is sorted, by default, the first entry is the hard decision which corresponds to the smallest Euclidean distance.

A simplification to the technique described above can be made using slicing techniques, which enables the best K candidates for $s_1(i)$, i=1, 2, ..., K, to be found by means of a binary search rather than an exhaustive search. Using a binary search, each $s_1(i)$ is expanded directly by its best symbol mate $s_2$ without requiring any sorting. A diagram illustrating this alternative idea of candidate list generation scheme is shown in FIG. 15 (applicable to 2×2 MIMO). A flow diagram illustrating a second candidate list generation method of the present invention is shown in FIG. 14.

Figure 14:
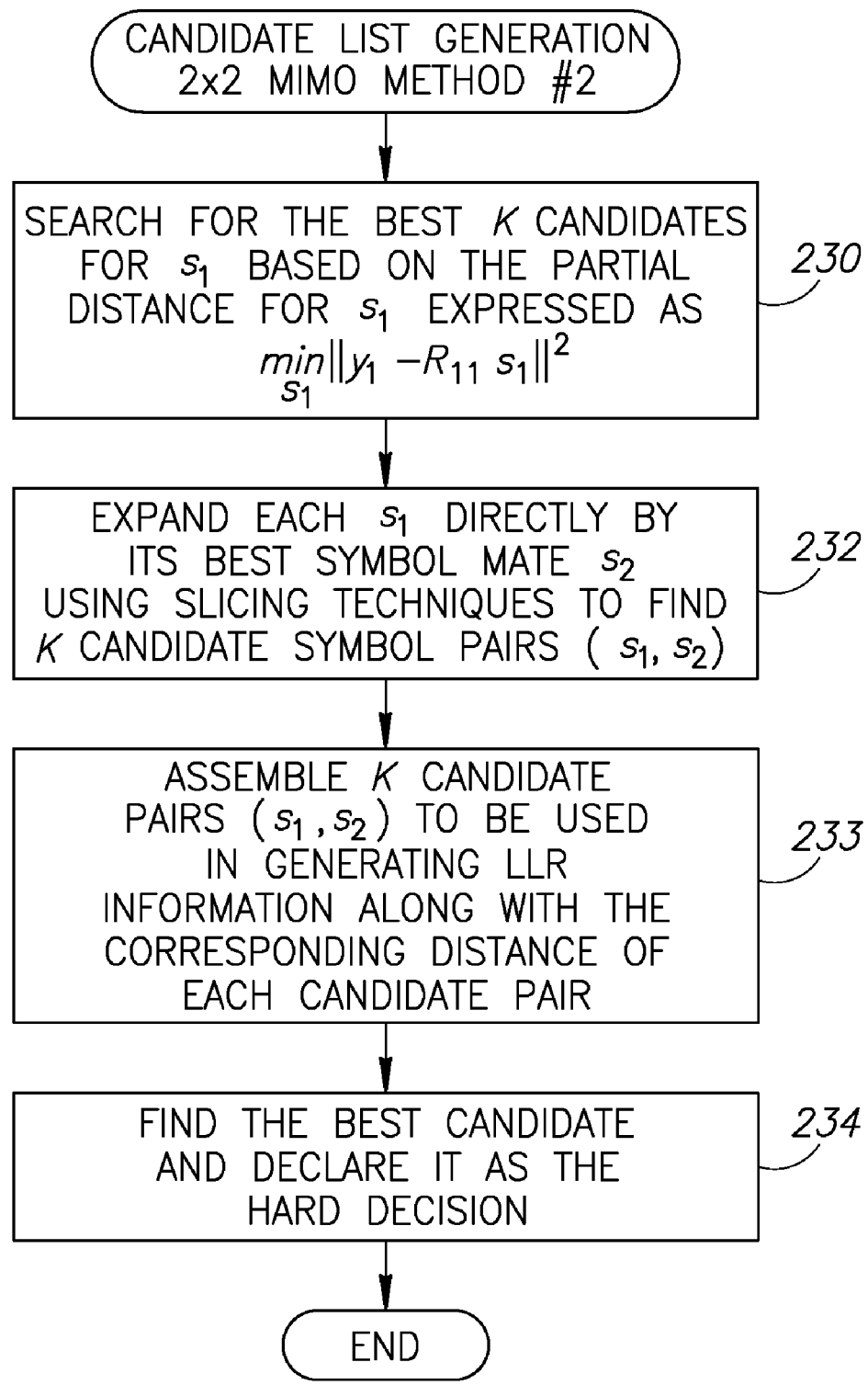
FIG. 14 is a flow diagram illustrating a second candidate list generation method of the present invention.
Figure 15:
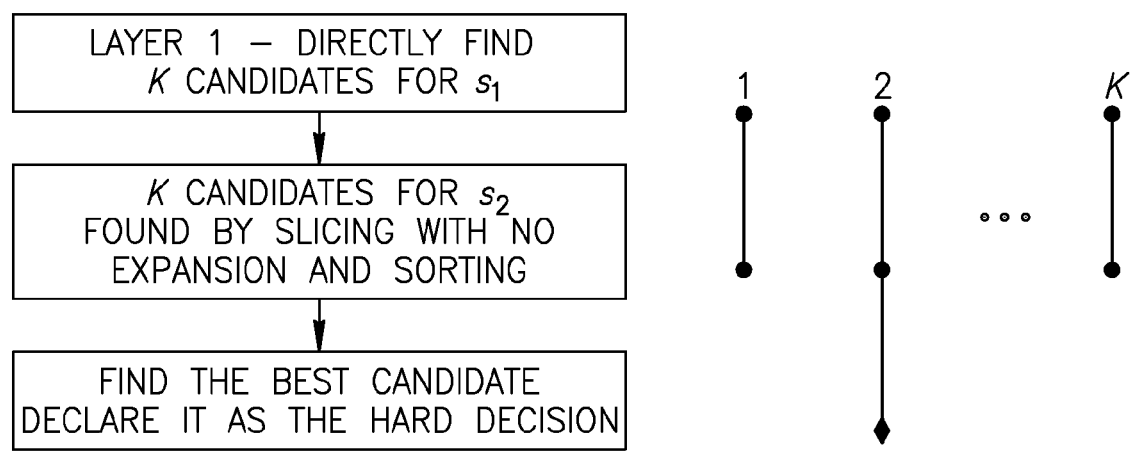
FIG. 15 is a diagram illustrating an alternative candidate list generation method of the present invention.

With reference to FIGS. 14 and 15, in the first stage, K candidates are chosen for one of the symbols (i.e. $s_1$) and saved in the candidate list (step 230). Let us denote this list of candidates by $\{s_1(1), s_1(2), \ldots, s_1(K)\}$. It is important to note that the values for $s_1$ comprise distinct values of the symbol taken from the constellation for $s_1$. The first stage list is generated by finding the symbol that satisfies the minimum partial distance for $s_1$ $$\min_{s_1} \|y_1 - R_{11}s_1\|^2 \qquad (30)$$

At the first stage, the best K candidate symbols for $s_1$ are found using a search based on the partial distance for $s_1$ expressed above in Equation 30 rather than one based on exhaustive search.

In accordance with the present invention, at the second and last stage, using only the results of the first stage search, each one of these candidates is extended to only one symbol mate $s_2(i)$ (step 232). The result of this step is a list of candidate pairs $\{[s_1(1),s_2(1)],[s_1(2),s_2(2)], \ldots, [s_1(K),s_2(K)]\}$. The extension of each candidate symbol $s_1(i)$ to a symbol pair is achieved by choosing the best symbol mate for that symbol which is the symbol mate that yields a symbol pair optimizing some cost function, e.g., minimizing some partial distance merit for the particular $s_1(i)$. Mathematically, this is expressed as the following partial distance $$s_2(i) = \operatorname*{argmin}_{s_2} \|y_2 - R_{21}s_1(i) - R_{22}s_2\|^2 \qquad (31)$$

In this step 232, each symbol for $s_1$ is then directly expanded by its best symbol mate $s_2$ using slicing techniques to yield K candidate symbol pairs $(s_1, s_2)$.

The resultant K candidate symbol pairs $(s_1, s_2)$ are stored in a table along with the corresponding Euclidean distances (i.e. costs) of each candidate pair to yield the basic candidate list (step 233). The contents of this list are subsequently used to generate soft value information (i.e. LLRs). The resulting candidate symbol pairs are then optionally sorted by Euclidean distance and the best symbol pair (i.e. entry at the top of the list corresponding to a minimum distance) is declared the hard decision (step 234).

The MIMO detection mechanism described supra is suitable for use in a 2×2 MIMO system. This mechanism, however, can be extended to the general case of a MIMO system using any number of transmit and receive antennas. When using a MIMO system with more than two transmit and receive antennas, the following extensions of the mechanism of the present invention can be made.

The number of receive and transmit antennas is denoted by $N_T$ and let $N_T>2$. The first extension stems directly from the K-best algorithm described in detail supra. As described, the K-best algorithm asserts at every stage an extension of every candidate into $M_E$ candidates resulting in $K \cdot M_E$ candidates from which the best K are chosen by means of sorting.

In accordance with the invention, the expansion and sorting is eliminated in the final stage. Namely, every candidate vector $s_{N_T-1}(i)=[s_1(i),s_2(i), \ldots, s_{N_T-1}(i)]$ can be expanded to $s(i)=s_{N_T}(i)=[s_{N_T-1}(i),s_{N_T}(i)]$ by directly matching the last symbol $s_{N_T}(i)$ to it. Rewriting Equation 24 in the case of $k=N_T$ yields the following $$D_{N_T}(i) = \sum_{n=1}^{N_T}\left\|y_n - \sum_{j=1}^{n} R_{n,j}s_j(i)\right\|^2 = \qquad (32)$$

-continued
$$D_{N_T-1} + \left\|y_{N_T} - \sum_{j=1}^{N_T-1} R_{N_T,j}s_j(i) - R_{N_T,N_T}s_{N_T}(i)\right\|^2$$

Examining Equation 32 it can be seen that once $[s_1(i), s_2(i), \ldots, s_{N_T-1}(i)]$ are set, $s_{N_T}(i)$ that minimizes Equation 32 can be directly found by a minimization of Equation 32. In the last stage, the K vectors found using the method described supra are sufficient for hard decision purposes as well as for LLR generation for a coded system. The minimization of Equation 32 can be carried out efficiently by means of slicing or a binary search over the constellation.

Figure 16:
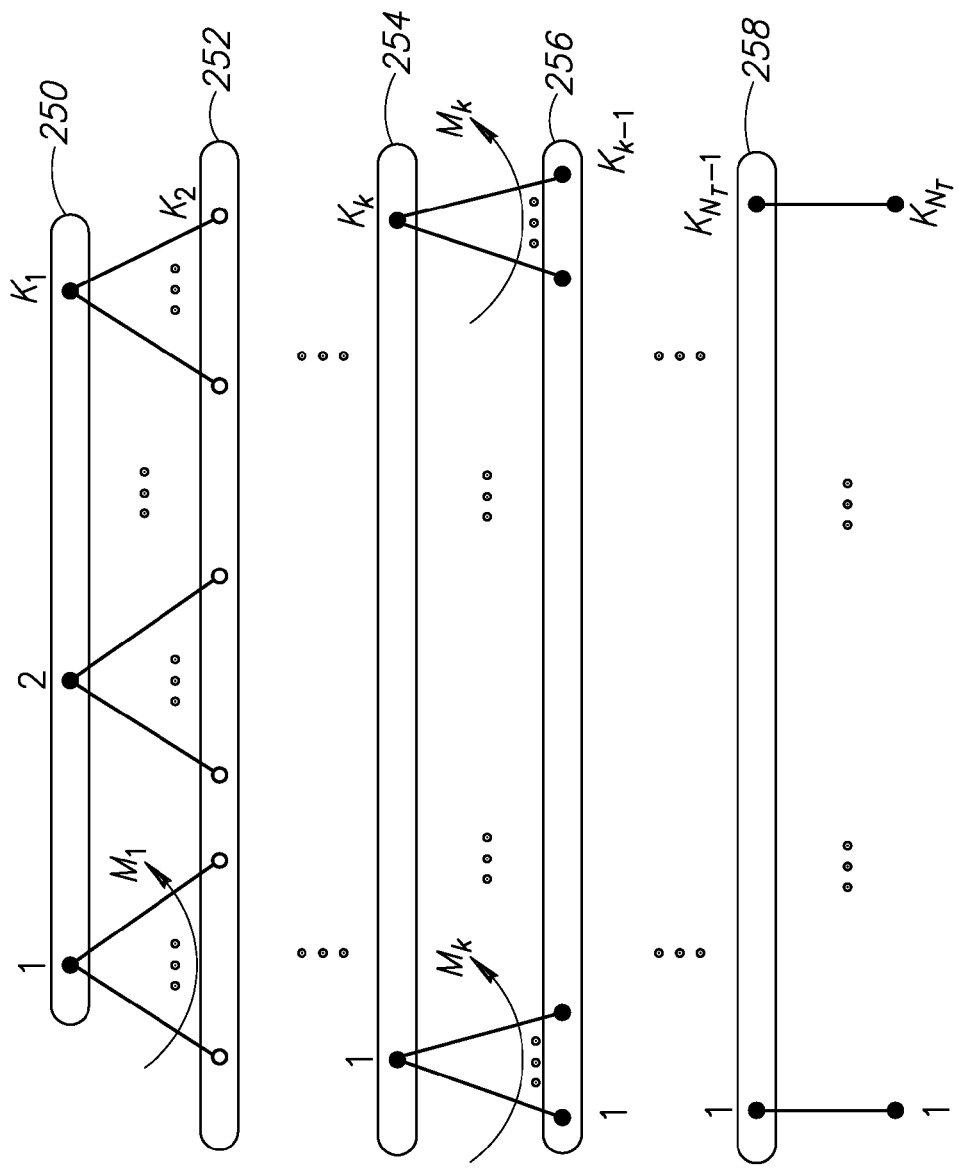
FIG. 16 is a diagram illustrating a candidate list generation method of the present invention for a general MIMO system.
Figure 16:
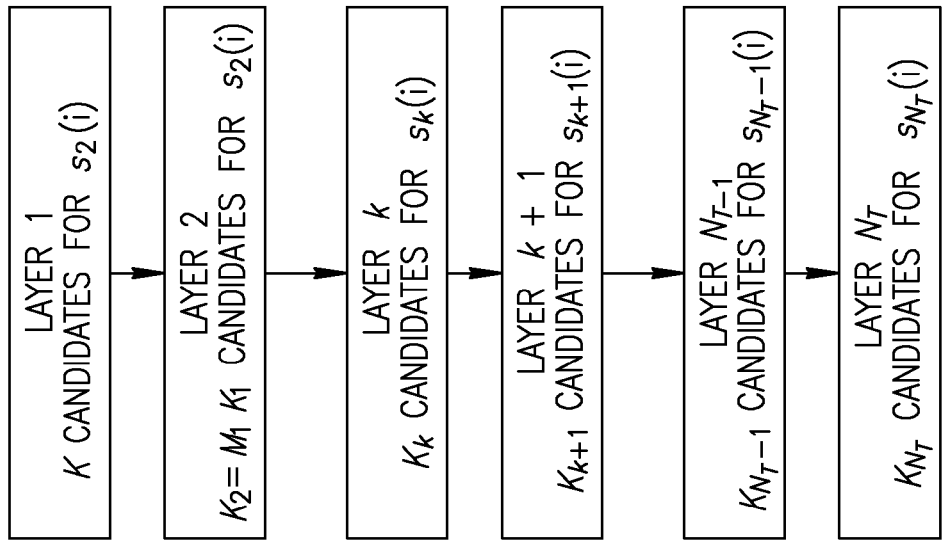

In a MIMO system having more than two transmit and receive antennas the present invention provides a mechanism of candidate list generation as an extension of the 2×2 MIMO detection mechanism. A diagram illustrating a candidate list generation method of the present invention for a general MIMO system is shown in FIG. 16.

The method starts with $K_1$ candidates in the first layer $s_1(i)$. Then at each successive layer k, the method spans every candidate (out of $K_k$ in layer k) into $M_k$ candidates in layer k+1. In this exemplary embodiment, there are $K_{k+1}=M_k K_k$ candidates in layer k+1. In the last layer, as in the case of 2×2 MIMO detection, $M_{N_T}=1$, implying that only a single symbol match in the last layer is paired to each candidate of the penultimate layer. At each layer, finding the best $M_k$ candidates of the next layer (for every candidate) can be found directly by means of slicing. In particular, one may choose $K_k=K$ and $M_k=M$, for some or all k values.

First and Second Symbol Refinement Rounds to Improve LLR Information

It is noted that if only a decision on the best symbol pair is desired, then the expansion scheme of the present invention described supra exhibits similar performance as the two stage expansion described above and by Equation 29. In other words, instead of choosing the best pair among a large list of symbol pairs $\{[s_1(i),s_2(i)]\}$, each candidate $s_1(i)$ is matched to a symbol mate $s_2(i)$ which yields the optimum cost (e.g., the minimum partial distance according to Equation 31 provided that the first symbol is $s_1(i)$. Thereafter, the best symbol pair may be chosen from among these contender pairs.

When it is desired to determine the K best elements within the list, however, the method of the present invention of expanding the symbol pairs differs from the two-stage expansion of FIG. 9 in that the results of the method of the present invention may not necessarily yield the K best elements (i.e. symbol pairs). As an example, consider that the second best element in one sub-list (which is not preserved for the final optimization stage) is better than the best element in a different sub-list. As a matter of design, the candidate list generated by the expansion scheme of the present invention yields the best K candidate symbol pairs with the constraint that they are all unique with regard to the first symbol (i.e. all first symbols are guaranteed to be different from each other).

In soft decision decoding, however, we are interested not only in the best symbol pair (i.e. the hard decision) but also in generating a sufficiently diverse list of candidates. This list preferably comprises symbol pairs having the best cost (i.e. minimum Euclidean distance from the received signal point) under the constraint that a given bit in their bit mapping is set to a value opposite that of the bit mapping of the winning symbol pair (i.e. the hard decision) while all the other bits are unconstrained.

Since a K-element list generated according to the single stage expansion tree search scheme described supra does not comprise the best K symbol pairs, a further extension of the present invention provides refinement rounds to the search routine. The refinement rounds function to augment the list with a small number of elements which comprise the desired bit values and distances required for generating LLR information. The complexity of these refinement rounds is relatively small compared to the complexity of sorting a long list. The basic candidate list before its augmentation in the refinement step is referred to as the basic candidate list and after the refinement step is referred to as the augmented candidate list.

To aid in understanding the refinement rounds of the present invention the generation of LLR values is revisited. The LLR value of the constituent bits of the two symbols of a 2×2 MIMO system is calculated according to Equation 7. The LLR of a particular bit is expressed as a function of the cost (e.g., Euclidean distance) of the hard decision $[\hat{s}_1, \hat{s}_2]$ and the cost of an additional symbol pair $[c_1, c_2]$ in which the value of the specified bit is opposite to that of the corresponding bit in the hard decision.

As an example, consider a 2×2 MIMO system with 64-QAM underlying constellation. The bit 64-QAM mapping of FIG. 6C is assumed. The two quadrature components of each symbol s are denoted by $s^I$ and $s^Q$. In addition, a concrete hard decision $[\hat{s}_1, \hat{s}_2] = [(\hat{s}_1^I, \hat{s}_1^Q), (\hat{s}_2^I, \hat{s}_2^Q)] = [(1,3)(-5,7)]$ is assumed. According to FIG. 6C, these symbols correspond to the following bit mapping [(001,000), (110,011)] using the convention of $(b_5 b_4 b_3 b_2 b_1 b_0)$ for the bit mapping of each symbol, i.e. the leftmost bit-triple correspond to the "I" quadrature component and the rightmost bit-triple stands for the "Q" quadrature component.

To obtain, for example, the LLR of the second bit in the representation of $s_1$, the symbol pairs are searched for the pair(s) in which this bit is set to a value opposite to that of the value of the corresponding bit in the hard decision (i.e. set to a '1'). Preferably, the symbol pair with the best (i.e. minimal) cost among the symbol pairs with the second bit equal to '1' is found, i.e. bit mapping $[(x_1 1 x_3 x_4 x_5 x_6), (x_7 x_8 x_9 x_{10} x_{11} x_{12})]$, where every $x_i$ for $i \neq 2$ are unconstrained. There are $\frac{1}{2} 64^2$ symbol pairs which meet the above constraint for every single bit.

Nearest reversed bit lists for the cases of 16-QAM and 64-QAM are presented below in Tables 1 and 2, respectively. In these two tables, $c_2(j)$ denotes the quadrature component of the symbol with the minimum distance to the hard decision $\hat{s}_2$ wherein the $j^{th}$ bit is set to a value opposite that of the corresponding bit in the hard decision. These tables correspond to the bit mapping of the constellations given in FIGS. 6B and 6C.

TABLE 1

Nearest reversed bit list for 16-QAM

| $\hat{s}_2^I$ | $c_2(3)$ | $c_2(2)$ | $\hat{s}_2^Q$ | $c_2(1)$ | $c_2(0)$ |
|---|---|---|---|---|---|
| −3 | 1 | −1 | −3 | 1 | −1 |
| −1 | 1 | −3 | −1 | 1 | −3 |
| 1 | −1 | 3 | 1 | −1 | 3 |
| 3 | −1 | 1 | 3 | −1 | 1 |

TABLE 2

Nearest reversed bit list for 64-QAM

| $\hat{s}_2^I$ | $c_2(5)$ | $c_2(4)$ | $c_2(3)$ | $\hat{s}_2^Q$ | $c_2(2)$ | $c_2(1)$ | $c_2(0)$ |
|---|---|---|---|---|---|---|---|
| −7 | 1 | −3 | −5 | −7 | 1 | −3 | −5 |
| −5 | 1 | −3 | −7 | −5 | 1 | −3 | −7 |
| −3 | 1 | −5 | −1 | −3 | 1 | −5 | −1 |
| −1 | 1 | −5 | −3 | −1 | 1 | −5 | −3 |
| 1 | −1 | 5 | 3 | 1 | −1 | 5 | 3 |
| 3 | −1 | 5 | 1 | 3 | −1 | 5 | 1 |
| 5 | −1 | 3 | 7 | 5 | −1 | 3 | 7 |
| 7 | −1 | 3 | 5 | 7 | −1 | 3 | 5 |

It is noted that the candidate list generated by prior art list-based algorithms such as the K-best algorithm include only a relatively small subset of these candidates if at all. The difference in the algorithms is the quality of the resultant candidate list, i.e. the number of candidates with bits having opposite values and their corresponding costs (i.e. the proximity of these bits to the received vector z). Different list based algorithms also differ in the list size, and in general a longer list yields better performance, since the larger list will have a higher probability for containing the desired candidate pairs.

An objective of the present invention is to improve the quality of candidate lists without making them overly large. This is achieved by determining the additional candidates that meet the requirement (i.e. having the bit opposite to that in the hard decision and having a small metric) rather than lengthening the candidate list in order to increase the probability of obtaining the desired candidates. The process of adding the desired candidates to the candidate list to generate the augmented candidate list is implemented in one or more refinement rounds. The refinement rounds are operative to add candidate pairs to the candidate list for specific bits whose LLR may be problematic when generated using the simplified search mechanism of the present invention. These bits are referred to as 'weak bits' which are defined as the bits for which the bit mapping of the candidate pairs in the basic candidate list is not sufficiently diverse. The refinement rounds usually exploit knowledge of the hard decision.

Figure 17:
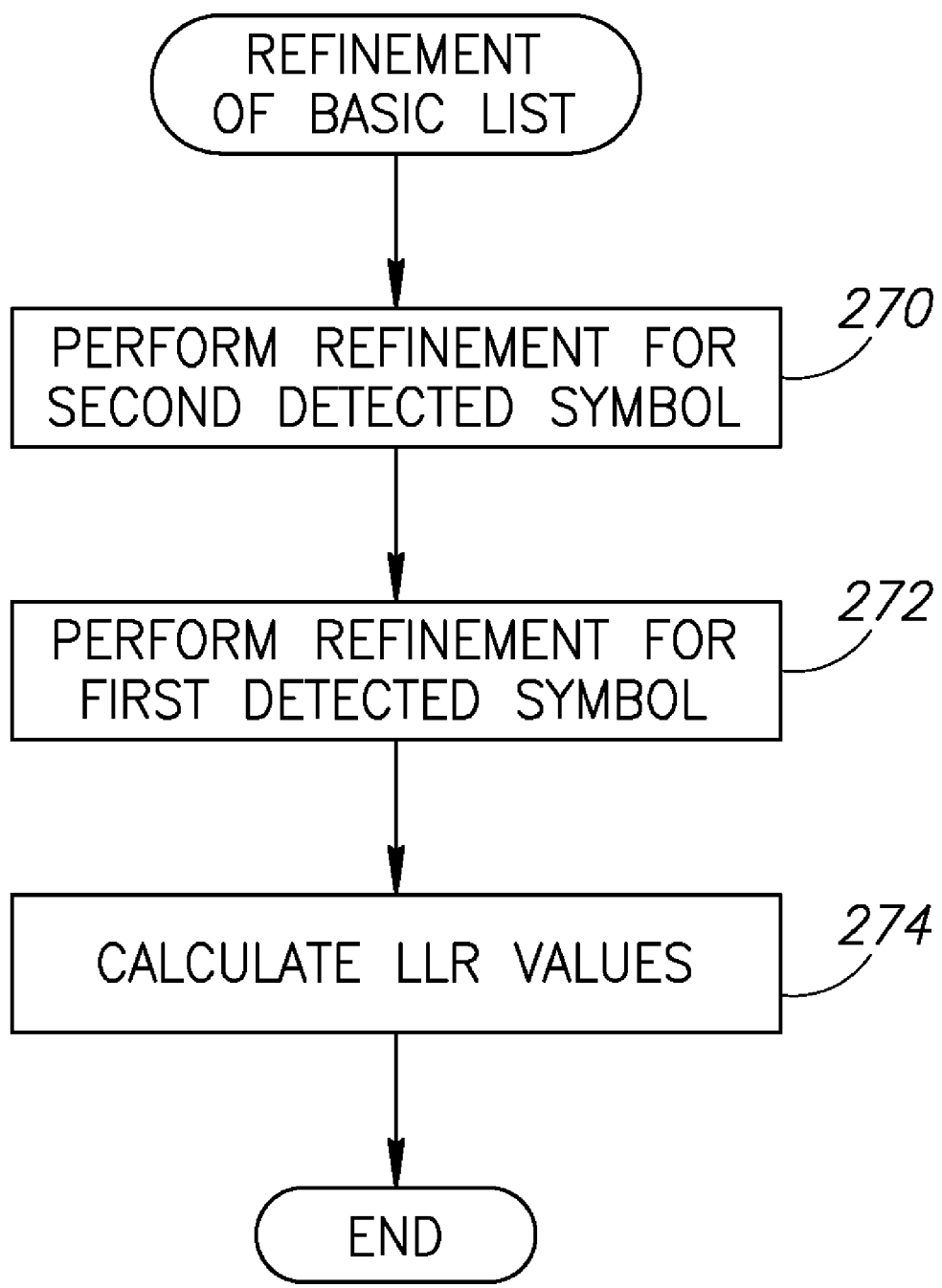
FIG. 17 is a flow diagram illustrating the refinement method of the present invention.

A flow diagram illustrating the refinement method of the present invention is shown in FIG. 17. Although the order of performing the refinement rounds is not critical, the refinement round for the second detected symbol is performed first in the exemplary embodiment presented herein (step 270). The refinement round for the first detected symbol is performed next (step 272). The resultant set of symbol candidates are then used to calculate corresponding LLR values (step 274). It is noted that the refinement rounds and associated LLR generation are performed by the LLR generator block 188 (FIG. 11). It is noted further that the invention is not limited to performing the above described two refinement rounds, as multiple refinement rounds for each symbol may be performed. In alternative embodiments, the refinement round may be performed for only one of the symbols instead of both. In addition, the order the refinement rounds are performed may be different.

Refinement Rounds for the Second Detected Symbol

The basic candidate list generated according to the present invention is not symmetrical with respect to the two symbols but rather exhibits better performance for the first detected symbol (i.e. $s_1$). The generation of the candidate list guarantees reliable LLR values for this symbol since in the first stage (FIG. 13) a plurality of K candidates $s_1$ is chosen so that each has a distinct value. When these candidates are expanded to symbol pairs with the most appropriate $s_2$ value, a sufficiently large set of distinct $s_2$ values may not exist in the basic candidate list. Thus, a small set of different $s_2$ values are found to match the plurality of $s_1$ values, since a single $s_2$ value may match multiple values of $s_1$. In order to overcome this problem, a refinement step is performed by the mechanism of the invention. The purpose of this step is to add additional symbol pairs to the candidate list having different values of the second symbol $s_2$. In this refinement round, one additional symbol pair for every information bit of $s_2$ is checked. This results in an additional b candidate pairs, where b represents the total number of bits represented by $s_2$.

Figure 18:
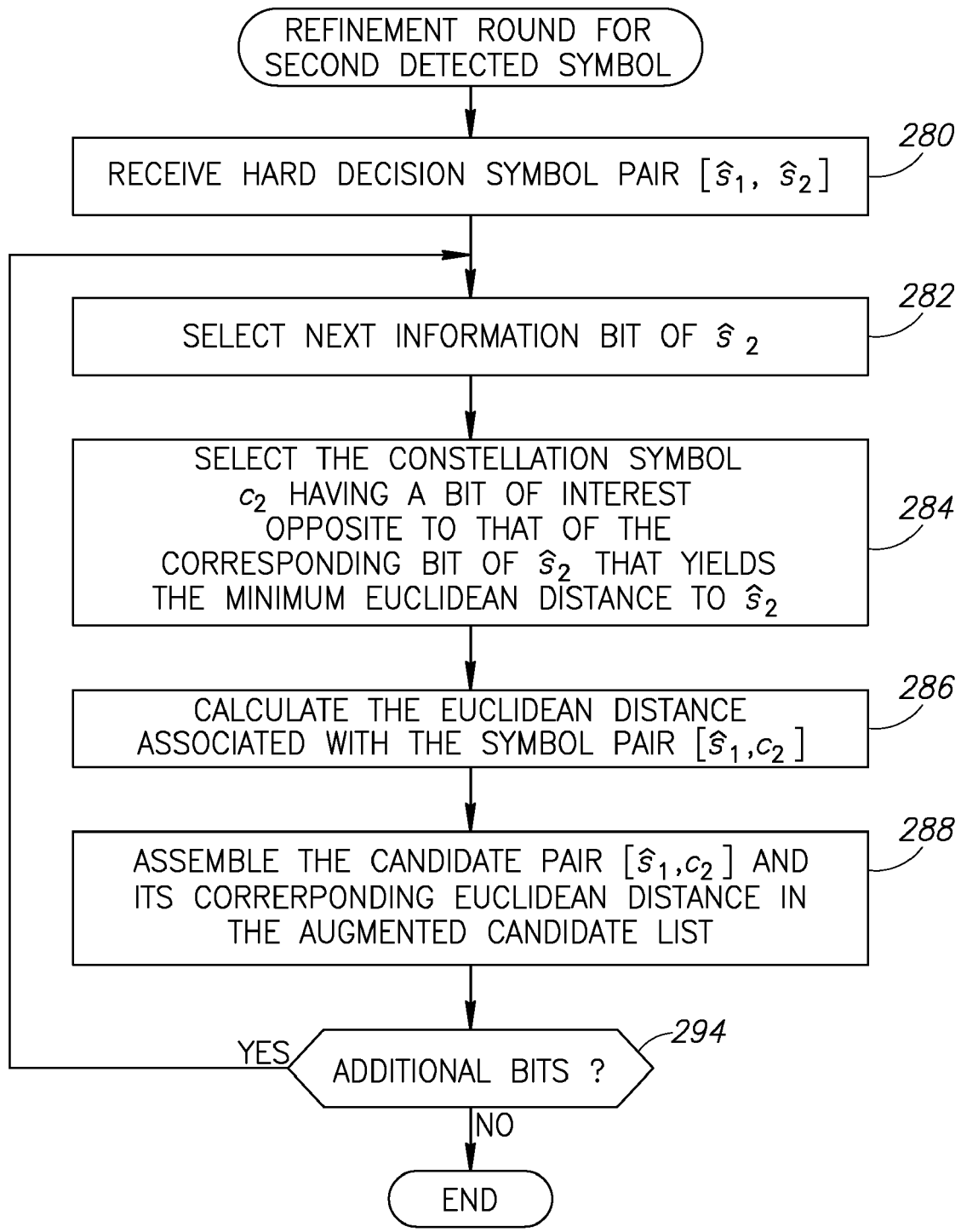
FIG. 18 is a flow diagram illustrating the refinement round method of the present invention for the second detected symbol.

A flow diagram illustrating the refinement round method of the present invention for the second detected symbol is shown in FIG. 18. The winning symbol pair is the hard decision on the two symbols and is the symbol pair residing in the first entry of the basic candidate list sorted in ascending order of cost. Let the winning symbol pair received from the candidate list generator be denoted as $[\hat{s}_1, \hat{s}_2]$ (step 280). The additional candidate pairs generated in this refinement round are $[\hat{s}_1, c_2(k)]$, (for every k=1, ..., b) where $c_2(k)$ represents the symbol having the minimum Euclidean distance to a symbol $\hat{s}_2$ that differs from it in the $k^{th}$ bit. Thus, the selection of $c_2(k)$ depends on the second symbol $\hat{s}_2$ of the hard decision and on the bit mapping of the constellation symbols.

The method loops through each information bit of $\hat{s}_2$ (step 282). For each bit position, the constellation symbol $c_2(k)$ is selected having a bit of interest opposite to that of the corresponding bit of $\hat{s}_2$ that yields the minimum Euclidean distance to $\hat{s}_2$ (step 284). This selection is based on Tables 1 and 2. The Euclidean distance associated with the symbol pair $[\hat{s}_1, c_2]$ is then calculated (step 286). The candidate pair $[\hat{s}_1, c_2]$ and its corresponding Euclidean distance are then assembled in the augmented candidate list (step 288). If there are additional bits to process (step 294), the method returns to step 282. Once the method completes, the same LLR calculation is then performed as in the basic candidate list processing described supra with the exception that the augmented candidate list is used rather than the basic candidate list. The augmented candidate list includes additional symbol pairs that are used for LLR calculation of the constituent bits of the second detected symbol.

Refinement Rounds for the First Detected Symbol

The purpose of this refinement round is to improve the reliability of the LLR values generated for some of the bits of the first detected symbol $\hat{s}_1$. Unlike the refinement round for the second detected symbol, the necessity of which stems from the decoding flow and its asymmetry with respect to the first and second detected symbol, the necessity of the refinement round for the first detected symbol stems from the bit mapping of the symbols in the constellation.

In certain detection cases, some bits of the first detected symbol may have the same value for all candidates in the list. For example, consider the 64-QAM constellation shown in FIG. 20 and assume that the basic candidate list contains the 16 candidates shown within 260 with hard decision 262. An inspection of FIG. 20 reveals that the sixth bit $b_5$ is zero for all 16 candidates. This will cause a problem in the calculation of the LLR of this bit, since the candidate list does not contain any candidates having a bit opposite in value to the corresponding bit of the hard decision, i.e. they all have the same value of '0'. Note that if the square 260 contained 25 symbols rather than 16, this refinement round would not be needed since with this constellation, it is guaranteed that some of the candidate symbols will a bit opposite in value to that of the hard decision.

Figure 19:
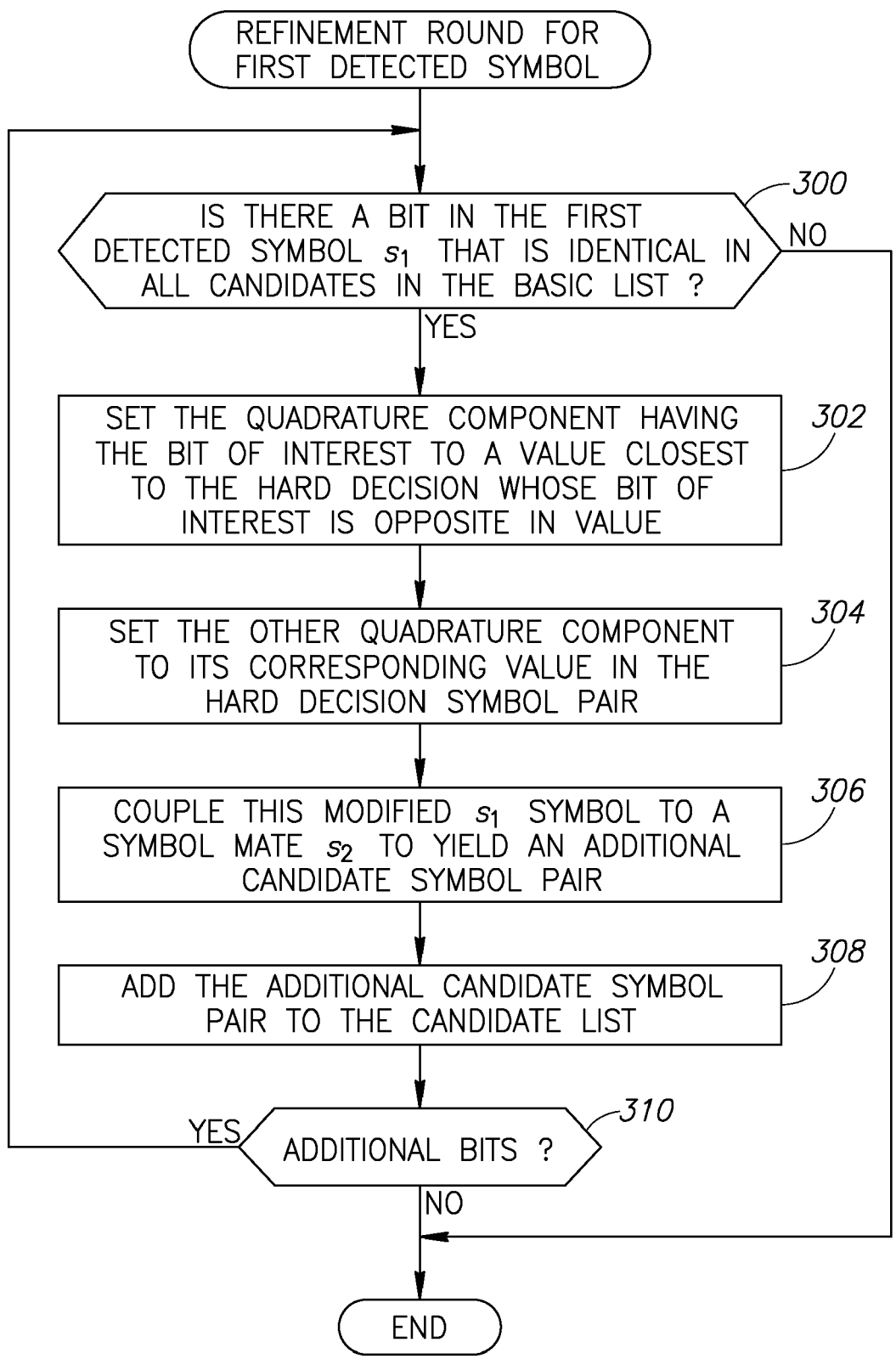
FIG. 19 is a flow diagram illustrating the refinement round method of the present invention for the first detected symbol.

A flow diagram illustrating the refinement round method of the present invention for the first detected symbol is shown in FIG. 19. To allow for reliable calculation of the LLR value for such bits, this refinement round considers at least one additional candidate for every bit of the first detected symbol for which the corresponding bit of all of the candidate symbols are the same (step 300). If there is no bit in the first detected symbol that is identical in all candidates, then the method is not needed.

The additional candidate is found by setting the quadrature component associated with the bit of interest in $s_1$ to the symbol value closest to the hard decision of this quadrature component whose bit of interest is opposite in value thereto (step 302). The other quadrature component of $s_1$ is set to its corresponding value in the hard decision symbol pair (step 304). The modified symbol $s_1$ is coupled to a symbol mate $s_2$ to yield an additional candidate symbol pair (step 306). The candidate symbol associated with the $i^{th}$ bit of $s_1$ is denoted by $c_1(i)$. This symbol value is now coupled to a symbol mate $s_2(i)$ according to Equation 31 above:

$$s_2(i) = \operatorname*{argmin}_{s_2} \|y_2 - R_{21}c_1(i) - R_{22}s_2\|^2. \tag{33}$$

That is, the symbol mate $s_2(i)$ is chosen to yield a symbol pair $[c_1(i), s_2(i)]$ that optimizes some cost function, e.g., minimizes some partial distance merit, for that particular $c_1(i)$. Once determined, the additional symbol pair is added to the augmented candidate list (step 308).

Figure 20:
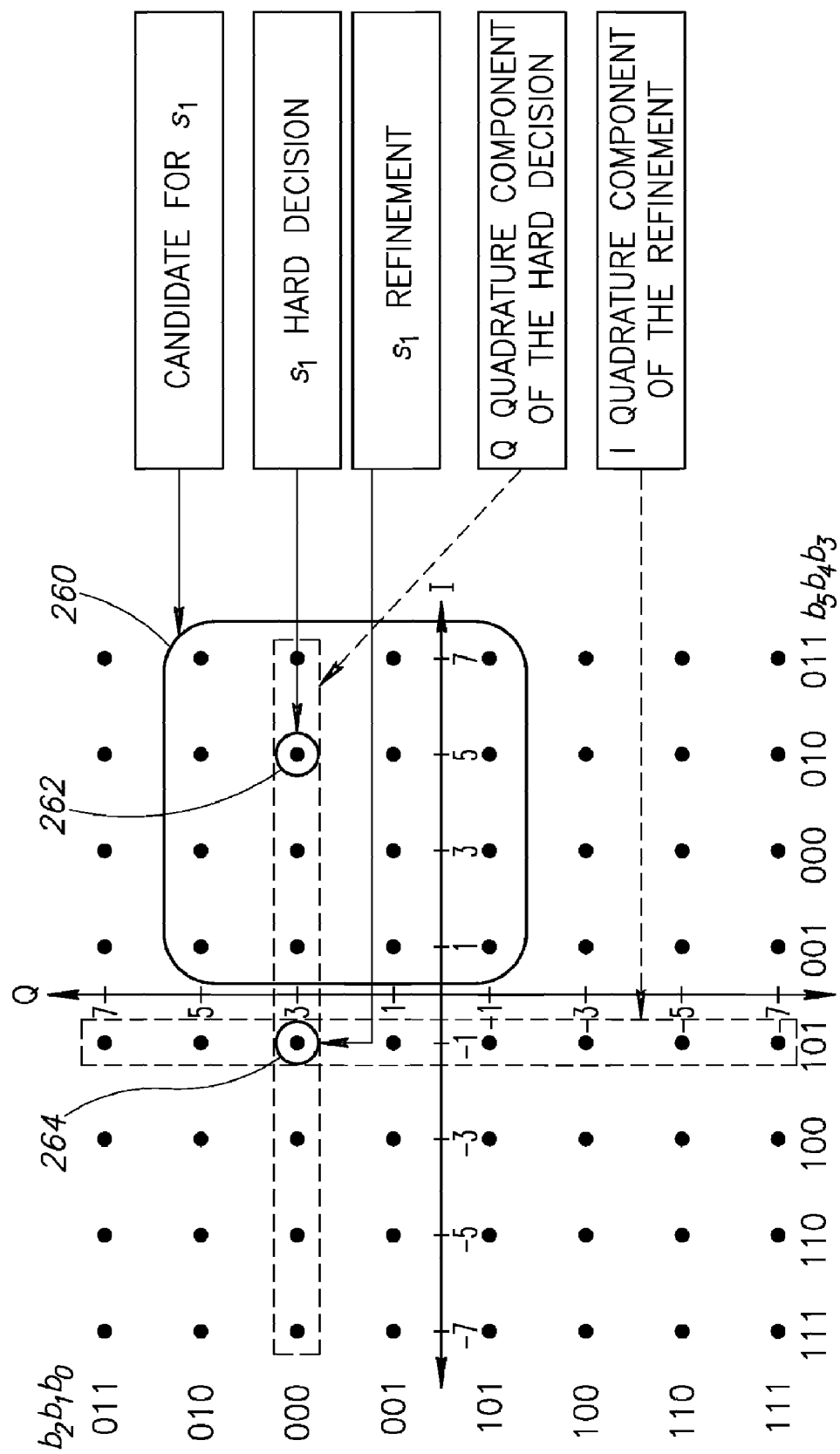
FIG. 20 is a diagram illustrating the refinement round method for the first detected symbol.

Referring to the example of FIG. 20, the additional candidate for the I component of $s_1$ is given the value of $$-\frac{1}{\sqrt{42}}$$

(symbol 264). This is the nearest symbol to the received signal point with a mapping of '1' for the bit $b_5$. Assuming that the hard decision is $$\frac{1}{\sqrt{42}}(5+3j),$$

the Q component will remain set to $$3\frac{1}{\sqrt{42}}.$$

The refinement round scheme of a 2×2 MIMO system described supra can be extended in a straightforward way to larger MIMO systems having more than two transmit and receive antennas. For the last decoded symbol, the desired symbol with the bit of interest flipped (with respect to the hard decision, leaving the bits of the previous symbols unchanged) is found using a table, just as in the 2×2 MIMO case. In previous layers, if a bit in an intermediate layer does not contain a sufficient diversity (i.e. does not appear in the final list with opposite value), then, an appropriate symbol (a symbol whose bit of interest is opposite in value to the corresponding bit of the hard decision) is added to the candidate list. The rest of the bits of the symbol (and of previously decoded symbols) are set to the corresponding values in the hard decision. The symbols of further layers decided by slicing and minimization of the total distance.

Generation of Bit LLRs—Method #1

Figure 21:
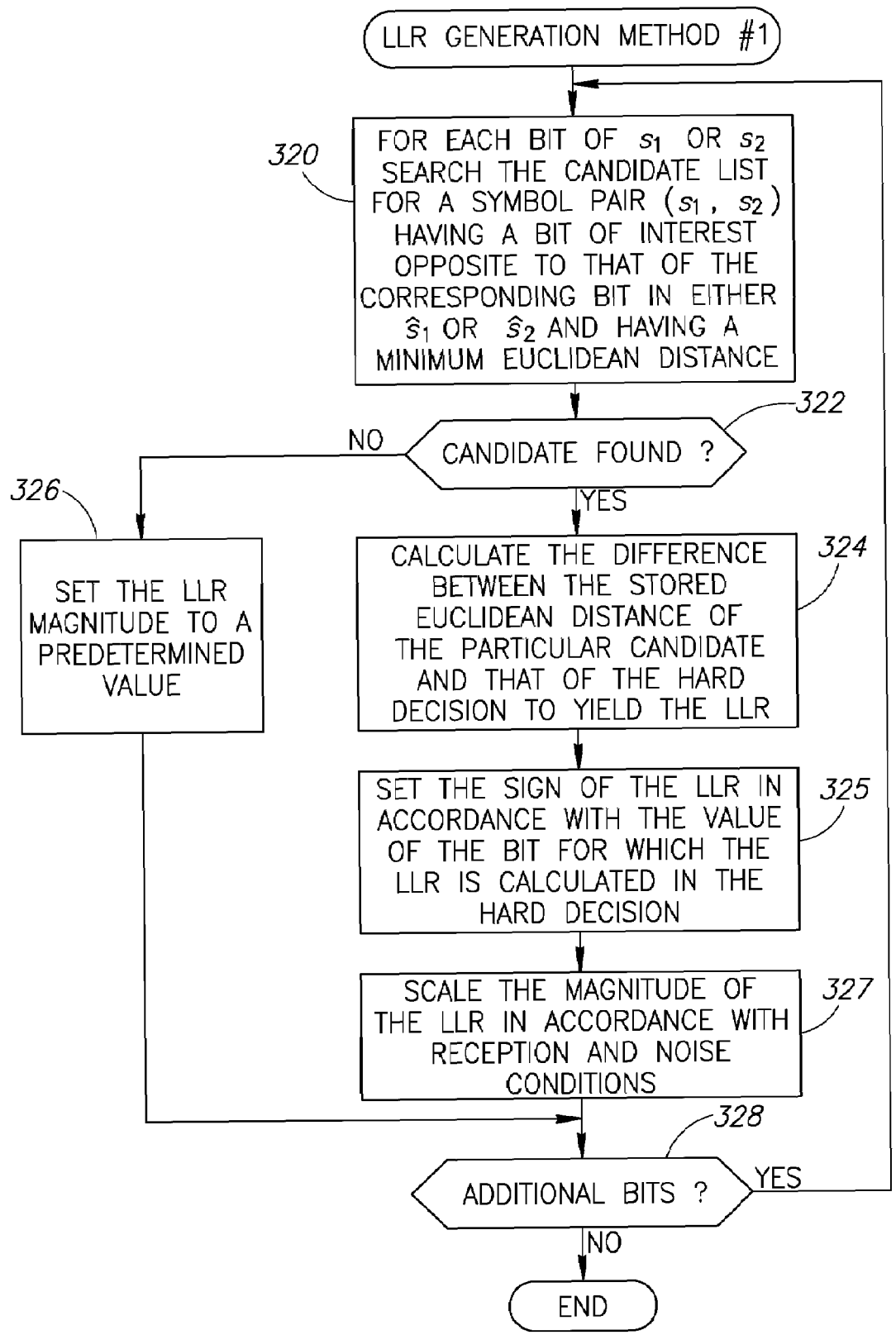
FIG. 21 is a flow diagram illustrating a first method of the generation of the bit LLR values.

The process of the generation of bit LLRs will now be described. A flow diagram illustrating a first method of the generation of the bit LLR values is shown in FIG. 21. For each bit of either symbols $s_1$ or $s_2$ the candidate list (either the basic or augmented) is searched for a symbol pair having a minimum Euclidean distance and whose bit of interest is opposite to that of the corresponding bit (in either $\hat{s}_1$ or $\hat{s}_2$) where $[\hat{s}_1, \hat{s}_2]$ represents the hard decision (step 320). If no such symbol pair is found in the candidate list (step 322), then the magnitude of the LLR is set to a predetermined value (step 326) and the method continues with step 328. If such a symbol is found (step 322), the difference between the stored Euclidean distance of the particular candidate pair and that of the hard decision is calculated to yield the bit LLR value (step 324). The sign of the LLR value is set in accordance with the value of the bit for which the LLR is calculated in the hard decision (step 325). The magnitude of the LLR value is then scaled in accordance with reception and noise conditions (step 327). These steps are described mathematically in Equations 8 and 9 presented supra. If additional bits remain (step 328), the method returns to step 320. Note that the bit LLR value is essentially a scaled version of the difference calculated in step 324 multiplied by either +1 or −1 in accordance with the value of the bit of interest in the hard decision.

Generation of Bit LLRs—Method #2

Figure 22:
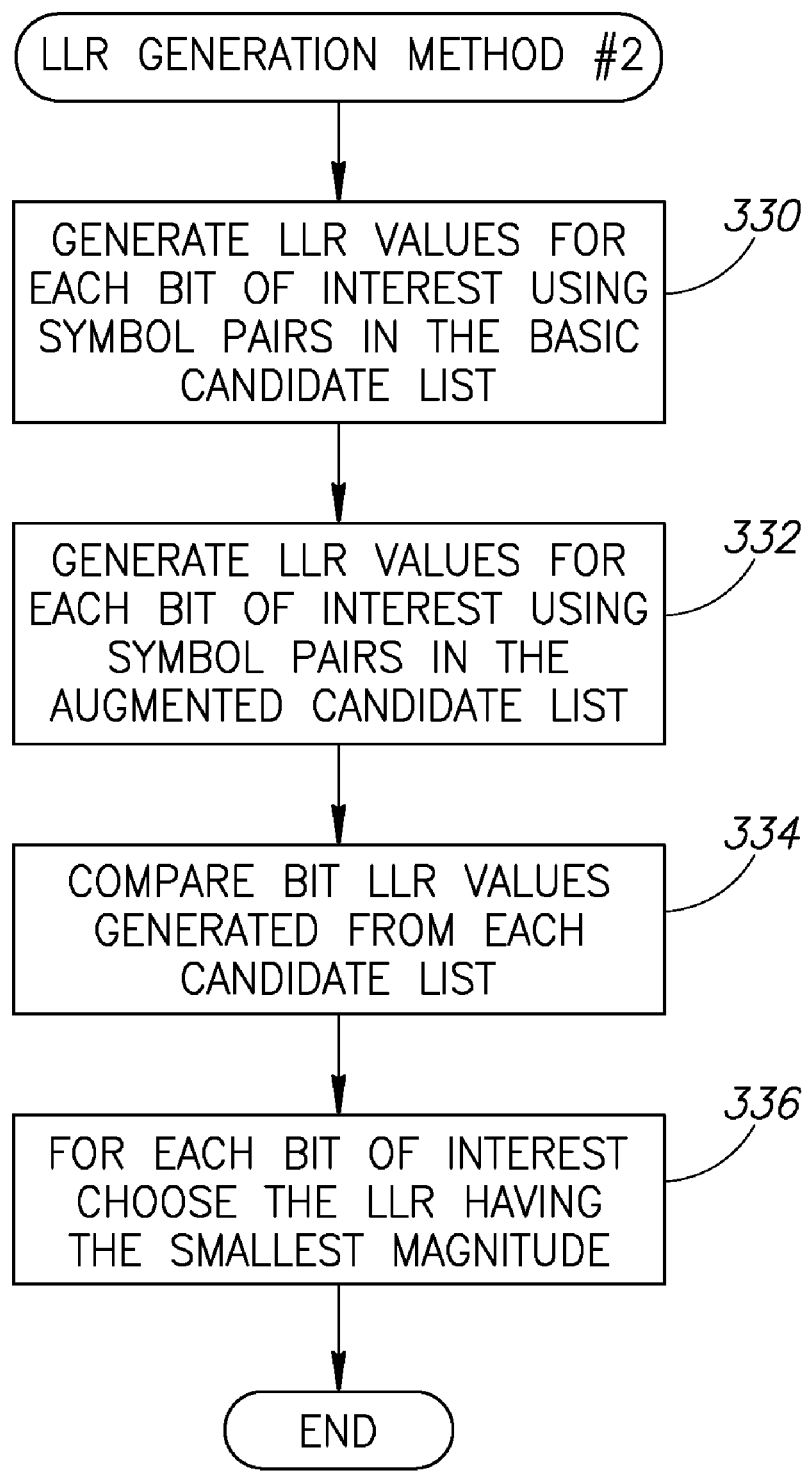
FIG. 22 is a flow diagram illustrating a second method of the generation of the bit LLR values.

A flow diagram illustrating a second method of the generation of the bit LLR values is shown in FIG. 22. In accordance with the invention, when one or more refinement rounds are performed, the bit LLR values can be calculated differently than in the method of FIG. 21 described above. In this second LLR generation method, two independent searches are performed, one based on the basic candidate list (step 330) and the second based on the list of the additional or augmented candidates generated as a result of the refinement rounds (step 330). In accordance with the second method, an independent LLR for each bit of interest is generated. The LLR values for a particular bit of interest are compared (step 334) and the LLR having the smallest magnitude (i.e. optimizes a cost function) from among the two is chosen as the final bit LLR (step 336).

Note that the refinement round method of FIG. 18 may be modified to incorporate the steps of this second LLR generation method. Specifically, the extra steps may be performed within the inner loop after step 288 and before step 294.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of soft information refinement of a second detected symbol for use in multiple-input, multiple-output (MIMO) systems, said method comprising the steps of:
   in a processor, for each information of said second detected symbol searching for a constellation symbol having a bit of interest opposite to that of a corresponding bit of a hard decision of said second detected symbol that optimizes a cost function; and
   forming additional candidate symbol pairs, each comprising a hard decision of a first detected symbol mated with one of said found constellation symbols.

2. The method according to claim 1, further comprising the step of, for each bit of interest, selecting between a first optimum cost function value for symbol pairs in a basic candidate list and a second optimum cost function value among said additional candidate symbol pairs.

3. The method according to claim 1, further comprising the step of calculating a cost function value associated with each additional candidate symbol pair.

4. The method according to claim 3, further comprising the step of adding said additional candidate symbol pairs and a value of said cost function to an augmented candidate list.

5. The method according to claim 1, further comprising the step of generating soft bit information as a function of said additional candidate symbol pairs.

6. The method according to claim 1, further comprising the steps of:
   for each bit of a candidate symbol in a candidate symbol pair, searching a candidate list for a symbol pair having a bit of interest opposite to that of a corresponding bit in a hard decision; and
   calculating soft information as the difference between a value of said cost function of said candidate symbol pair and that of a corresponding hard decision.

7. The method according to claim 6, further comprising the steps of:
   setting the sign of said soft information in accordance with the value of the bit for which said soft information is calculated in said hard decision; and
   scaling the magnitude of said soft information in accordance with reception and noise conditions.

8. The method according to claim 1, further comprising the steps of:
   generating soft information values for each bit of interest of a candidate symbol pair in a basic candidate list;
   generating soft information values for each bit of interest utilizing said additional candidate symbol pairs;
   comparing soft bit information values generated from said basic candidate list and from said additional candidate symbol pairs; and
   choosing, for each bit of interest, the soft information value having a minimum magnitude as a result of said comparison.

9. A method of soft information refinement of a first detected symbol for use in multiple-input, multiple-output (MIMO) systems, said method comprising the steps of:
   in a processor, for each bit in said first detected symbol that is common in all candidate symbol pairs within a basic candidate list, setting a first quadrature component associated with said bit of interest in said first detected symbol to a symbol value closest to the hard decision of said first quadrature component whose bit of interest is opposite in value thereto;

setting a second quadrature component of said first detected symbol to its corresponding value in said hard decision to generate a modified first detected symbol thereby; and forming an additional candidate symbol pair by mating said modified first detected symbol to a second symbol, wherein said second symbol in said additional candidate pair is chosen to optimize a cost function when mated with said modified first detected symbol.

10. The method according to claim 9, further comprising the step of selecting between a best metric in said basic candidate list and a best metric among said additional candidate symbol pairs.

11. The method according to claim 9, further comprising the step of calculating a cost function associated with each additional candidate symbol pair.

12. The method according to claim 9, further comprising the step of adding said additional candidate symbol pair to an augmented candidate list.

13. The method according to claim 9, further comprising the step of generating soft bit information values as a function of said additional candidate symbol pairs.

14. The method according to claim 9, further comprising the steps of:

generating soft information values for each bit of interest of a candidate symbol pair in said basic candidate list;

generating soft information values for each bit of interest utilizing said additional candidate symbol pairs;

comparing soft bit information values generated from said basic candidate list and from said additional candidate symbol pairs; and choosing, for each bit of interest, the soft information value having a minimum magnitude as a result of said comparison.

15. An apparatus for soft information refinement of a second detected symbol in a multiple-input, multiple-output (MIMO) system, comprising:

a processor operative to:
search, for each information bit of said second detected symbol, for a constellation symbol having a bit of interest opposite to that of a corresponding bit of a hard decision of said second detected symbol that optimizes a cost function;

assemble additional candidate symbol pairs, each comprising a hard decision of a first detected symbol mated with one of said found constellation symbols; and a memory for storing said additional candidate symbol pairs.

16. An apparatus for soft information refinement of a first detected symbol in a multiple-input, multiple-output (MIMO) system, comprising:

a processor operative to:
set, for each bit in said first detected symbol that is common in all candidate symbol pairs, a first quadrature component associated with said bit of interest in said first detected symbol to a symbol value closest to the hard decision of said first quadrature component whose bit of interest is opposite in value thereto;

set a second quadrature component of said first detected symbol to its corresponding value in said hard decision to generate a modified first detected symbol thereby;

form an additional candidate symbol pair by mating said modified first detected symbol to a second symbol, wherein said second symbol in said additional candidate date pair is chosen to optimize a cost function when mated with said modified first detected symbol; and a memory for storing said additional candidate symbol pairs.

17. A computer program product characterized by that upon loading it into computer memory a soft information refinement process is executed, said computer program product comprising:

a computer usable medium having computer usable program code for performing soft information refinement of a second detected symbol in a multiple-input, multiple-output (MIMO) system, said computer program product including;

computer usable program code for searching, for each information bit of said second detected symbol, for a constellation symbol having a bit of interest opposite to that of a corresponding bit of a hard decision of said second detected symbol that optimizes a cost function; and computer usable program code for forming additional candidate symbol pairs, each comprising a hard decision of a first detected symbol mated with one of said found constellation symbols.

18. A computer program product characterized by that upon loading it into computer memory a soft information refinement process is executed, said computer program product comprising:

a computer usable medium having computer usable program code for performing soft information refinement of a first detected symbol in a multiple-input, multiple-output (MIMO) system, said computer program product including;

computer usable program code for setting, for each bit in said first detected symbol that is common in all candidate symbol pairs, a first quadrature component associated with said bit of interest in said first detected symbol to a symbol value closest to the hard decision of said first quadrature component whose bit of interest is opposite in value thereto;

computer usable program code for setting a second quadrature component of said first detected symbol to its corresponding value in said hard decision to generate a modified first detected symbol thereby; and computer usable program code for forming an additional candidate symbol pair by mating said modified first detected symbol to a second symbol, wherein said second symbol in said additional candidate pair is chosen to optimize a cost function when mated with said modified first detected symbol.

19. A multiple-input, multiple-output (MIMO) radio receiver coupled to a plurality of antennas, comprising:

a radio frequency (RF) receiver front end circuit for receiving a plurality of radio signals transmitted over a MIMO channel and downconverting the received radio signals to baseband signals;

a demodulator adapted to demodulate said baseband signal in accordance with the modulation scheme used to generate said transmitted radio signals;

a MIMO soft information refinement processor for refining a second detected symbol, said processor operative to:
search, for each information bit of said second detected symbol, for a constellation symbol having a bit of interest opposite to that of a corresponding bit of a hard decision of said second detected symbol that optimizes a cost function;

assemble additional candidate symbol pairs, each comprising a hard decision of a first detected symbol mated with one of said found constellation symbols;

generate soft bit information values as a function of said additional candidate symbol pairs; and a channel decoder operative to receive and decode said soft bit information values to generate receive data therefrom.

20. A multiple-input, multiple-output (MIMO) radio receiver coupled to a plurality of antennas, comprising:

a radio frequency (RF) receiver front end circuit for receiving a plurality of radio signals transmitted over a MIMO channel and downconverting the received radio signals to baseband signals;

a demodulator adapted to demodulate said baseband signal in accordance with the modulation scheme used to generate said transmitted radio signals;

a MIMO soft information refinement processor for refining a first detected symbol, said processor operative to:

set, for each bit in said first detected symbol that is common in all candidate symbol pairs, a first quadrature component associated with said bit of interest in said first detected symbol to a symbol value closest to the hard decision of said first quadrature component whose bit of interest is opposite in value thereto;

set a second quadrature component of said first detected symbol to its corresponding value in said hard decision to generate a modified first detected symbol thereby;

form an additional candidate symbol pair by mating said modified first detected symbol to a second symbol, wherein said second symbol in said additional candidate pair is chosen to optimize a cost function when mated with said modified first detected symbol; and a channel decoder operative to receive and decode said soft bit information values to generate receive data therefrom.

* * * * *